(12) United States Patent
Koorapaty et al.

(10) Patent No.: US 10,091,774 B2
(45) Date of Patent: Oct. 2, 2018

(54) DISCOVERY SIGNALS AND PROCEDURES

(71) Applicant: Telefonaktiebolaget L M Ericsson (publ), Stockholm (SE)

(72) Inventors: Havish Koorapaty, Saratoga, CA (US); Sorour Falahati, Stockholm (SE); Mattias Frenne, Uppsala (SE); George Jöngren, Sundbyberg (SE); Muhammad Kazmi, Bromma (SE); Daniel Larsson, Vallentuna (SE); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 143 days.

(21) Appl. No.: 14/909,340

(22) PCT Filed: Jan. 29, 2015

(86) PCT No.: PCT/IB2015/050688
§ 371 (c)(1),
(2) Date: Feb. 1, 2016

(87) PCT Pub. No.: WO2015/114566
PCT Pub. Date: Aug. 6, 2015

(65) Prior Publication Data
US 2016/0192332 A1 Jun. 30, 2016

Related U.S. Application Data

(60) Provisional application No. 61/933,595, filed on Jan. 30, 2014.

(51) Int. Cl.
*H04W 72/04* (2009.01)
*H04W 48/12* (2009.01)
(Continued)

(52) U.S. Cl.
CPC .......... *H04W 72/042* (2013.01); *H04L 5/005* (2013.01); *H04L 5/0051* (2013.01); *H04W 8/005* (2013.01);
(Continued)

(58) Field of Classification Search
None
See application file for complete search history.

(56) References Cited

U.S. PATENT DOCUMENTS 7,844,289 B2 * 11/2010 Bykovnikov .......... H04B 7/269
370/350
2013/0163461 A1 * 6/2013 Kim ..................... H04B 7/0626
370/252
(Continued)

FOREIGN PATENT DOCUMENTS

EP 2 811 797 A1 12/2014
WO WO 2013/115259 A1 8/2013

OTHER PUBLICATIONS

3GPP™ TR 36.872 V12.0.0 3$^{rd}$ Generation Partnership Project: Technical Specification Group Radio Access Network; Small cell enhancements for E-UTRA and E-UTRAN—Physical layer aspects (Release 12), pp. 1-77, Sep. 2013.
(Continued)

*Primary Examiner* — Bunjob Jaroenchonwanit
(74) *Attorney, Agent, or Firm* — Sage Patent Group

(57) ABSTRACT

According to some embodiments, a wireless device receives (1020) a discovery burst from a network node (115). The same discovery burst includes multiple signals within at least one subframe, each of the multiple signals having one or more associated measurement functions. At least one of the multiple signals is received with multiple repetitions within the same discovery burst and two or more repetitions of the same type of signal can be combined by the wireless device. The wireless device performs (1024) at least one
(Continued)

radio measurement based at least in part on a particular one of the signals of the discovery burst. The performed at least one radio measurement corresponds to a measurement function associated with the particular signal of the discovery burst.

20 Claims, 14 Drawing Sheets

(51) Int. Cl.
| | |
|---|---|
| H04L 5/00 | (2006.01) |
| H04W 8/00 | (2009.01) |
| H04W 8/24 | (2009.01) |
| H04W 36/00 | (2009.01) |

(52) U.S. Cl.
CPC .............. *H04W 8/24* (2013.01); *H04W 48/12* (2013.01); *H04W 72/0413* (2013.01); *H04W 36/0083* (2013.01)

(56) References Cited

U.S. PATENT DOCUMENTS

| | | | | |
|---|---|---|---|---|
| 2013/0188624 | A1* | 7/2013 | Lee | H04W 24/02 370/338 |
| 2013/0258913 | A1* | 10/2013 | Challa | H04J 3/06 370/280 |
| 2014/0038598 | A1* | 2/2014 | Ren | H04W 48/16 455/434 |
| 2014/0133395 | A1* | 5/2014 | Nam | H04B 7/0452 370/328 |
| 2014/0357274 | A1* | 12/2014 | Teng | H04W 36/0083 455/436 |
| 2014/0369223 | A1* | 12/2014 | Takeda | H04J 11/0093 370/252 |
| 2015/0092768 | A1* | 4/2015 | Ng | H04W 48/16 370/350 |
| 2015/0280894 | A1* | 10/2015 | Charbit | H04B 7/2656 370/281 |
| 2015/0304076 | A1* | 10/2015 | Lee, II | H04L 5/005 370/329 |
| 2015/0326363 | A1* | 11/2015 | Yoon | H04W 72/0446 370/329 |
| 2015/0327097 | A1* | 11/2015 | Chai | H04W 24/08 370/252 |
| 2015/0334611 | A1* | 11/2015 | Kim | H04W 36/0083 370/331 |
| 2016/0007406 | A1* | 1/2016 | Yi | H04W 52/0206 370/252 |
| 2016/0014626 | A1* | 1/2016 | Yi | H04J 11/0053 370/252 |
| 2016/0157116 | A1* | 6/2016 | Zhang | H04W 48/16 370/252 |
| 2016/0212724 | A1* | 7/2016 | Seo | H04W 56/0025 |
| 2016/0234878 | A1* | 8/2016 | Svedman | H04W 68/005 |
| 2016/0249333 | A1* | 8/2016 | Freda | H04W 72/0406 |
| 2016/0261325 | A1* | 9/2016 | Ko | H04B 7/0691 |
| 2016/0270146 | A1* | 9/2016 | Feuersaenger | H04W 52/0225 |
| 2016/0294527 | A1* | 10/2016 | Yoon | H04W 72/0446 |
| 2016/0337952 | A1* | 11/2016 | Li | H04W 48/16 |
| 2017/0013565 | A1* | 1/2017 | Pelletier | H04W 52/146 |
| 2017/0105225 | A1* | 4/2017 | Sartori | H04W 72/085 |
| 2017/0208572 | A1* | 7/2017 | Park | H04W 72/042 |
| 2017/0230974 | A1* | 8/2017 | Choi | H04W 72/0446 |
| 2017/0231029 | A1* | 8/2017 | Pelletier | H04W 76/046 |

OTHER PUBLICATIONS

3GPP™ Work Item Description "3GPP™ TSG RAN Meeting #62, Busan, Korea" Title: Small cell enhancements-physical layer aspects-core part, 7 pages, Dec. 3-5, 2013.
PCT Notification of Transmittal of the International Search Report and the Written Opinion of the International Searching Authority, or the Declaration for International application No. PCT/IB2015/050688, Apr. 16, 2015.
3GPP TSG RAN WG1 Meeting #74; Barcelona, Spain; Source: Fujitsu; Title: Discussion on efficient discovery of small cells (R1-133135), Aug. 19-23, 2013.
3GPP TSG-RAN WG1 #75; San Francisco, USA; Source: MediaTek Inc.; Title: New Small Cell Discovery and Measurement Scheme Based on CRS (R1-135434), Nov. 11-15, 2013.
3GPP TSG RAN WG1 Meeting #74bis; Guangzhou, China; Source: CMCC; Title: Enhancement of Small Cell Discovery and the Measurements (R1-134578), Oct. 7-11, 2013.
3GPP TSG-RAN WG1 Meeting #76bis; Shenzhen, P.R. China; Source: NSN, Nokia; Title: Discovery Signals and Measurements (R1-141533), Mar. 31-Apr. 4, 2014.

* cited by examiner

DISCOVERY SIGNALS AND PROCEDURES

PRIORITY

This nonprovisional application is a U.S. National Stage Filing under 35 U.S.C. § 371 of International Patent Application Serial No. PCT/IB2015/050688 filed Jan. 29, 2015 and entitled "DISCOVERY SIGNALS AND PROCEDURES" and U.S. Provisional Patent Application No. 61/933,595 filed Jan. 30, 2014, both of which are hereby incorporated by reference in their entirety.

TECHNICAL FIELD

The present disclosure relates, in general, to wireless communications and, more particularly, to discovery signals and procedures in wireless communications technology.

BACKGROUND

3GPP LTE technology is a mobile broadband wireless communication technology in which transmissions from base stations (referred to as eNBs) to mobile stations (referred to as user equipment (UE)) are sent using orthogonal frequency division multiplexing (OFDM). OFDM splits the signal into multiple parallel sub-carriers in frequency.

FIG. 1 is a schematic diagram of an LTE downlink physical resource. The basic unit of transmission in LTE is a resource block (RB) which in its most common configuration consists of 12 subcarriers and 7 OFDM symbols (one slot). A unit of one subcarrier and 1 OFDM symbol is referred to as a resource element (RE) 10. Thus, an RB consists of 84 REs.

FIG. 2 is a schematic diagram of a downlink LTE radio subframe 210. Radio subframe 210 is composed of two slots in time and multiple resource blocks in frequency, with the number of RBs determining the bandwidth of the system. Furthermore, the two RBs in a subframe that are adjacent in time may be denoted as an RB pair. Currently, LTE supports standard bandwidth sizes of 6, 15, 25, 50, 75 and 100 RB pairs.

In the time domain, LTE downlink transmissions are organized into radio frames of 10 ms, with each radio frame consisting of ten equally-sized subframes of length $T_{subframe}=1$ ms. The signal transmitted by an eNB in a downlink (the link carrying transmissions from the eNB to the UE) subframe may be transmitted from multiple antennas, and the signal may be received at a UE that has multiple antennas. The radio channel distorts the transmitted signals from the multiple antenna ports. In order to demodulate any transmissions on the downlink, a UE relies on reference symbols (RS) that are transmitted on the downlink.

FIG. 3 is a schematic diagram illustrating reference signals in frequency division duplex (FDD) and time division duplex (TDD). More specifically, diagram 305 illustrates reference signals in FDD and diagram 310 illustrates reference signals in TDD. FIG. 3 illustrates a plurality of reference signals in FDD and TDD. In Rel. 11 and prior releases of LTE, there are multiple types of reference symbols. For example, FIG. 3 illustrates common reference symbol (CRS) 315, channel state information reference symbol (CSI-RS) 320, primary synchronization signal (PSS) 325, secondary synchronization signal (SSS) 330, and demodulation reference symbols (DM-RS) 335 and 340. The reference signals shown in FIG. 3 are illustrated over two subframes of duration 1 ms each.

In operation, these reference symbols and their position in the time-frequency grid are known to the UE, and hence can be used to synchronize to the downlink signal and determine channel estimates by measuring the effect of the radio channel on these symbols. PSS 325 and SSS 330 are used for cell search and coarse time and frequency synchronization. CRS 315 are used for channel estimation during demodulation of control and data messages, in addition to synchronization. CRS 315 occur once every subframe. CSI-RS 320 are also used for channel state feedback related to the use of transmission modes that enable UE-specific antenna precoding. These transmission modes use the UE-specific DM-RS 335 and 340 at the time of transmission, with the precoding at the eNB performed based on the feedback received from and measured by the UE on CSI-RS 320.

PSS 325 and SSS 330 may define the cell ID of the cell. SSS 330 can take 168 different values representing different cell ID groups. PSS 325 can take three different values that determine the cell ID within a group. Thus, there are a total of 504 cell IDs. PSS 325 are Zadoff-Chu sequences of length 63, which along with 5 zeros appended on each edge, occupy the 73 subcarriers in the central 6 RBs. SSS 330 are two m-sequences of length 31 that occupy alternate REs and are appended with 5 zeros on each edge and located in the central 6 RBs as is the case for PSS 325. PSS 325 and SSS 330 sequences may occur in subframes 0 and 5. The PSS may be the same in both subframe 0 and 5, while the SSS sequences may differ between the subframes. The sequence transmitted in subframe 0 is referred to as $SSS_1$ while the sequence transmitted in subframe 5 is referred to as $SSS_2$. The sequence $SSS_2$ swaps the two length-31 m-sequences transmitted as part of the sequence $SSS_1$ in subframe 0.

SUMMARY

According to some embodiments, a method comprises receiving (1020) a discovery burst from a network node (115). The discovery burst comprises multiple signals within at least one subframe. Each of the multiple signals has one or more associated measurement functions. The discovery burst comprises N subframes occurring with a periodicity of once every M subframes, where N is greater than or equal to 1. The method also comprises performing at least one radio measurement based at least in part on a particular one of the signals of the discovery burst, the performed at least one radio measurement corresponding to a measurement function associated with the particular signal of the discovery burst.

According to some embodiments, a wireless device receives a discovery burst from a network node. The discovery burst comprises multiple signals within at least one subframe. Each of the multiple signals has one or more associated measurement functions. The discovery burst comprises N subframes occurring with a periodicity of once every M subframes, where N is greater than or equal to 1. The wireless device performs at least one radio measurement based at least in part on a particular one of the signals of the discovery burst, the performed at least one radio measurement corresponding to a measurement function associated with the particular signal of the discovery burst.

In certain embodiments, N is less than or equal to 5 subframes and M is greater than or equal to 10 subframes. As an example, M is one of 40, 80, or 160 subframes.

In certain embodiments, at least one of the multiple signals is received with multiple repetitions within the same discovery burst, and two or more repetitions of the same type of signal can be combined by the wireless device. The discovery burst may be sent over multiple subframes, and the multiple subframes may be consecutive. The multiple signals of the discovery burst may include one or more of a primary synchronization signal, a secondary synchronization signal, a cell-specific reference signal, and a channel state information reference symbol. In certain embodiments, the wireless device may report a set of radio resource measurements to the network node. The wireless device may communicate capability information to the network node. The capability information may indicate whether the wireless device is capable of using the discovery burst for performing at least one radio measurement. The at least one radio measurement may be based only on the signals occurring within the discovery burst.

According to some embodiments, a method comprises creating a discovery burst based on one or more criteria. The discovery burst comprises multiple signals within at least one subframe. Each of the multiple signals has one or more associated measurement functions, and the multiple signals of the discovery burst are for performing, by a wireless device, at least one radio measurement. The at least one radio measurement is based at least in part on a particular one of the signals of the discovery burst and corresponds to a measurement function associated with the particular signal of the discovery burst. The discovery burst comprises N subframes occurring with a periodicity of once every M subframes, where N is greater than or equal to 1. The method further comprises transmitting the discovery burst for use by the wireless device performing the at least one radio measurement.

According to some embodiments, a network node creates a discovery burst based on one or more criteria. The discovery burst comprises multiple signals within at least one subframe. Each of the multiple signals has one or more associated measurement functions, and the multiple signals of the discovery burst are for performing, by a wireless device, at least one radio measurement. The at least one radio measurement is based at least in part on a particular one of the signals of the discovery burst and corresponds to a measurement function associated with the particular signal of the discovery burst. the discovery burst comprises N subframes occurring with a periodicity of once every M subframes, where N is greater than or equal to 1. The network node transmits the discovery burst for use by the wireless device performing the at least one radio measurement.

In certain embodiments, N is less than or equal to 5 subframes and M is greater than or equal to 10 subframes. As an example, M is one of 40, 80, or 160 subframes.

In certain embodiments, the one or more criteria may include one or more of a signal quality at one or more wireless devices, a speed of one or more wireless devices, a location of one or more wireless devices, and a recommendation received from one or more wireless devices. The recommendation may recommend multiple repetitions or processes of one or more signals for transmission within the discovery burst by the network node. In certain embodiments, the network node may receive, from the wireless device, a set of radio resource measurements. The radio resource measurements may be based at least in part on the multiple signals of the discovery burst. In certain embodiments, the network node may receive, from the wireless device, capability information. The capability information may indicate to the network node whether the wireless device is capable of using the discovery burst to perform at least one radio measurement. The network node may perform one or more radio operations based at least in part on the received capability information.

Embodiments disclosed herein may have one or more technical advantages. As an example, certain embodiments provide discovery bursts containing information that a wireless device may use to make some essential measurements on a cell. The use of discovery bursts may improve the ability of the wireless device to make measurements on a cell that is off for long periods of time, such a small cell that is used to increase cell density when needed and is turned off when not in use. Particular embodiments may include all, some, or none of these advantages. Other advantages of the present disclosure may be apparent to one of ordinary skill of the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, the various reference signals may be used by a UE for a variety of purposes. In certain network configurations, however, such as those having dense deployment of small cells, reference signal structures developed for regular deployments within existing systems, such as 3GPP LTE, may have too high a density, resulting in unnecessary interference. In order to address the problem of unnecessary interference, solutions to turn small cells off when they are not being used are being considered. The present disclosure contemplates various embodiments that may address the problem of unnecessary interference, while still allowing a UE to make essential measurements on cells even when the cells are off for long periods of time.

Figure 4:
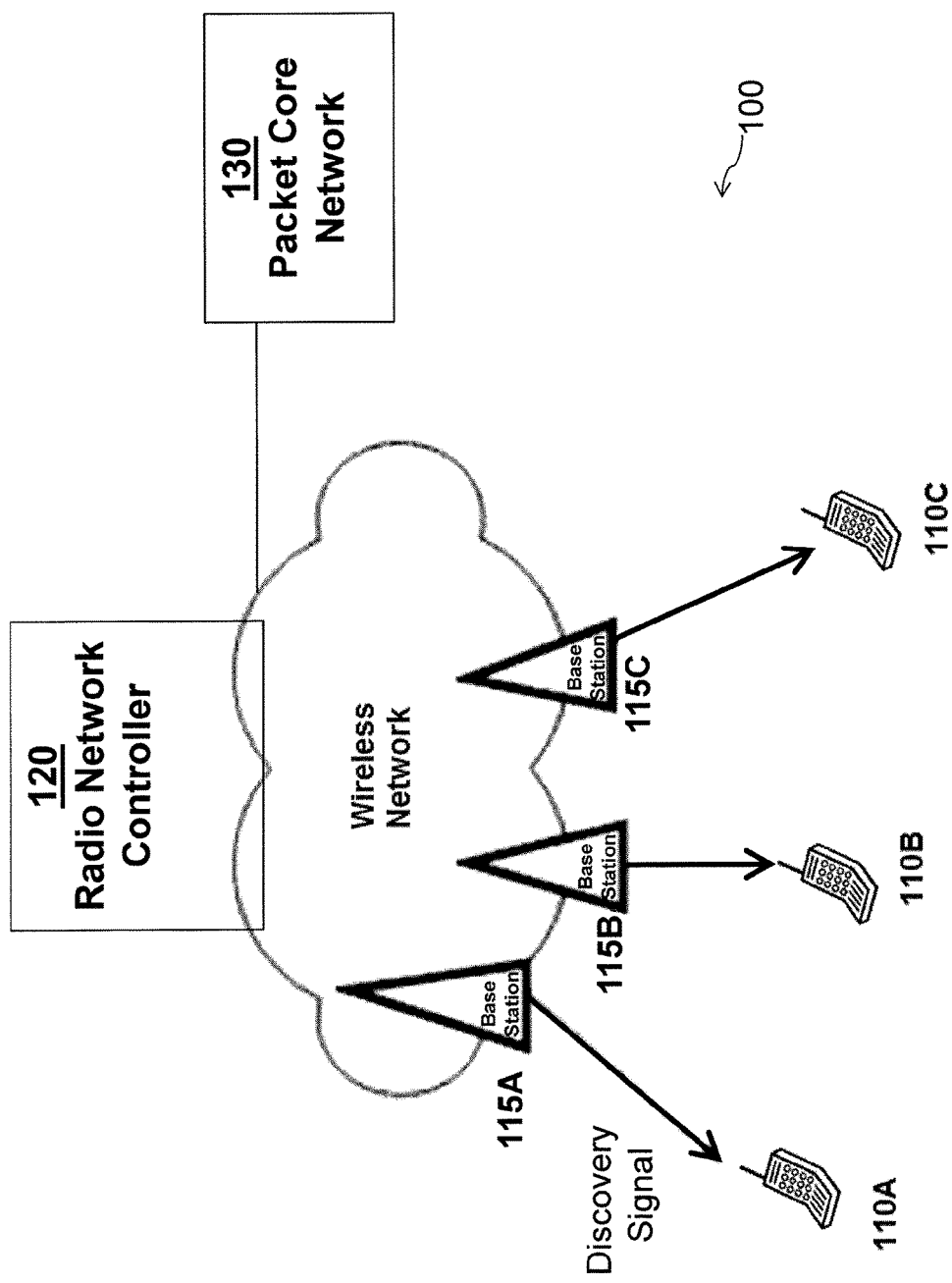
FIG. 4 is a block diagram illustrating embodiments of a network that includes one or more wireless device(s), radio network node(s), radio network controller(s), and core network node(s)

FIG. 4 is a block diagram illustrating embodiments of a network 100 that includes one or more wireless device(s) 110 (which may be interchangeably referred to as UEs 110), radio network node(s) 115 (which may be interchangeably referred to as eNBs 115), radio network controller(s) 120, and core network node(s) 130. A wireless device 110 may communicate with a radio network node 115 over a wireless interface. For example, wireless device 110 may transmit wireless signals to radio network node 115 and/or receive wireless signals from radio network node 115. The wireless signals may contain voice traffic, data traffic, control signals, and/or any other suitable information. In some embodiments, an area of wireless signal coverage associated with a radio network node 115 may be referred to as a cell.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding.

In some embodiments, core network node 130 may manage the establishment of communication sessions and various other functionality for wireless device 110. Wireless device 110 may exchange certain signals with core network node 130 using the non-access stratum layer. In non-access stratum signaling, signals between wireless device 110 and core network node 130 may be transparently passed through the radio access network. Example embodiments of wireless device 110, radio network node 115, and other network nodes (such as radio network controller 120 or core network node 130) are described with respect to FIGS. 12, 13, and 14, respectively.

Several radio-related measurements are used by wireless device 110 or network node 115 to establish and keep the connection, as well as to ensure the quality of a radio link. The measurements are used in RRC idle state operations such as cell selection, cell reselection (e.g., between E-UTRANs, between different RATs, and to non-3GPP RATs), and minimization of drive test (MDT), and also in RRC connected state operations such as for cell change (e.g., handover between E-UTRANs, handover between different RATs, and handover to non-3GPP RATs).

In operation, UE 110 has to first detect a cell, and therefore cell identification e.g., acquisition of a physical cell identity (PCI), is also a signal measurement. UE 110 may also have to acquire the cell global ID (CGI) of an eNB. The received signal power and quality (RSRP and RSRQ) are measurements that are used for at least radio resource management (RRM) in support of mobility, which includes mobility in RRC connected state as well as in RRC idle state. The RSRP and RSRQ are also used for other purposes, such as for enhanced cell ID positioning, minimization of drive test, etc. UE 110 also performs measurements on the serving cell (aka primary cell) in order to monitor the serving cell performance. This is referred to as radio link monitoring (RLM), or RLM related measurements in LTE. For RLM, UE 110 monitors the downlink link quality based on the cell-specific reference signal in order to detect the downlink radio link quality of the serving or PCell.

Dense deployments of small cells are attractive to increase system capacity. However, dense deployments typically have fewer UEs 110 connected to each cell, and lower resource utilization with higher rates provided when the cells are used. As described above, reference signal structures developed for regular deployments within existing systems, such as 3GPP LTE, may have too high a density such that there is a lot of unnecessary interference created when deployments become dense. In such a scenario, reference signals may be transmitted even when there is no data being sent to UEs 110.

In order to address the problem of unnecessary interference, solutions to turn small cells off when they are not being used are being considered. To ensure that cells can be ready to deliver data to and receive data from UEs 110 with minimal delay, however, it is necessary for UEs 110 to make some essential measurements on cells even when they are off. In order to facilitate this, a set of reference signals that are sent with much lower density in time have been discussed in 3GPP. Such signals are referred to as discovery signals and procedures associated with them as discovery procedures.

In small cell on/off, the eNB 115 can be off for long periods of time. In order to assist UE 110 with the measurements, a discovery signal may be needed. The discovery signal should support the properties required for enabling RRM measurements, RLM related procedures, and coarse time/frequency synchronization. In order to make the measurements possible, the eNB 115 has to wake up periodically (e.g., once every 80 ms, or 160 ms, etc.) and send the discovery signal, so that it can be used by UE 110 for mobility related operations such as cell identification, RLM, and measurements.

In order to detect out of sync and in sync status to the cell, UE 110 compares the estimated quality with the thresholds Qout and Qin respectively. The threshold Qout and Qin are defined as the level at which the downlink radio link cannot be reliably received, and correspond to 10% and 2% block error rate of a hypothetical PDCCH transmission, respectively. When small cell on/off is used, the above measurements need to be made as necessary on a discovery signal when it is transmitted.

There are a number of considerations that should be taken into account in the design of a discovery signal. Since the discovery signal may be rather sparse in time, it is desirable that UE 110 be able to make a meaningful measurement in one instance of the discovery signal, rather than having to wait for multiple instances that may occur tens or hundreds of milliseconds apart. In addition, in order to make the measurement based on fewer samples in time more reliable, the discovery signal may need to be sent over a wide bandwidth (e.g., the whole bandwidth). Another consideration for the discovery signal is the possibility to make measurements on individual transmission points that are geographically not co-located but that belong to the same logical cell. Yet another consideration is the ability to expand the number of cell IDs that can be assigned to cells. Still another consideration is to ensure proper operation of legacy UEs 110, even as the discovery signal can be used for enhancements for newer UEs 110. Furthermore, facilitating the efficient measurement of RSRP and RSRQ for different transmission points within a cell is another motivation for the discovery signal/procedure. These transmission points may be geographically in separate locations but perform coordinated transmissions as a logical single cell entity. Furthermore, a key problem is the design of this discovery signal in a manner so as to ensure minimal disruption to legacy UEs 110 while providing adequate performance and meeting all of the above goals for newer UEs 110.

Existing solutions rely on the use of existing signals designed for certain functions to perform other functions. For example, one existing solution is to use CSI-RS to perform functions such as cell identification, with reliance on the fact that other cells don't transmit on the CSI-RS REs being used by a cell. This, however, can lead to inadequate robustness of measurement performance. Another drawback of this solution is that network synchronization becomes essential, and performance is severely compromised when the network is unsynchronized. Other solutions rely on repeating existing signals over multiple subframes, or within the existing subframe. This approach can lead to problems when legacy UEs 110 are connected to the cell. These solutions also do not provide any ability to expand the number of cell IDs that may be assigned to cells in the network. Various embodiments of the present disclosure may address these and other deficiencies associated with existing solutions.

In certain embodiments, network nodes 115 of network 100 may utilize a discovery burst comprising one or more discovery signals. In certain embodiments, a network node, such as network node 115A, may create a discovery burst. Network node 115A may transmit the discovery signal to one or more UEs 110. For example, network node 115A may transmit a discovery signal to UE 110A. In certain embodiments, UE 110 may receive a discovery burst consisting of N>=1 subframes occurring once every M subframes. UE 110 may perform one or more measurements. For example, UE 110 may perform time and frequency synchronization and CSI feedback measurements. In certain embodiments, the one or measurements may be based only on the signals occurring within the discovery bursts. For example, in certain embodiments UE 110 may not assume the presence of signals in any other downlink subframe unless explicitly configured to expect such signals to be transmitted.

In operation, UE 110A may receive a discovery burst from network node 115A consisting of subframe 0 as described above in relation to FIG. 3. UE 110A may then use the CRS for time and frequency synchronization, and to provide wideband CQI feedback to enable data reception using a CRS based transmission mode in a subsequent subframe. UE 110A may also use the CSI-RS configured in the subframe to provide CSI feedback, including wideband CQI and PMI, to enable reception of data based on the UE-specific DM-RS in a subsequent subframe. In certain embodiments, UE 110A does not use signals in any subframes other than those that are part of the discovery burst in order to generate this feedback.

In some cases, the discovery burst may have a defined periodicity. For example, the defined periodicity may be once every 40 ms. In certain embodiments, network node 115A may configure UE 110A to provide more detailed feedback, such as sub-band PMI, when the discovery burst periodicity is greater than a given threshold. For example, network node 115A may configure UE 110A to provide more detailed feedback where the discovery burst periodicity is greater than once every 40 ms, and configure UE 110A to provide less detailed feedback, e.g., only wideband CQI, when the discovery burst periodicity is less than the threshold, e.g., when it occurs only once every 160 ms.

As described above, a network node 115, such as network node 115A, may transmit a discovery signal to UE 110 as part of a discovery burst. In certain embodiments, network node 115A may transmit a discovery signal within a discovery burst that is at least one subframe (of length 1 ms) with multiple different SSS in the subframe. In certain embodiments, network node 115 may transmit a discovery signal with one or more additional secondary synchronization signal sequences.

Figure 5:
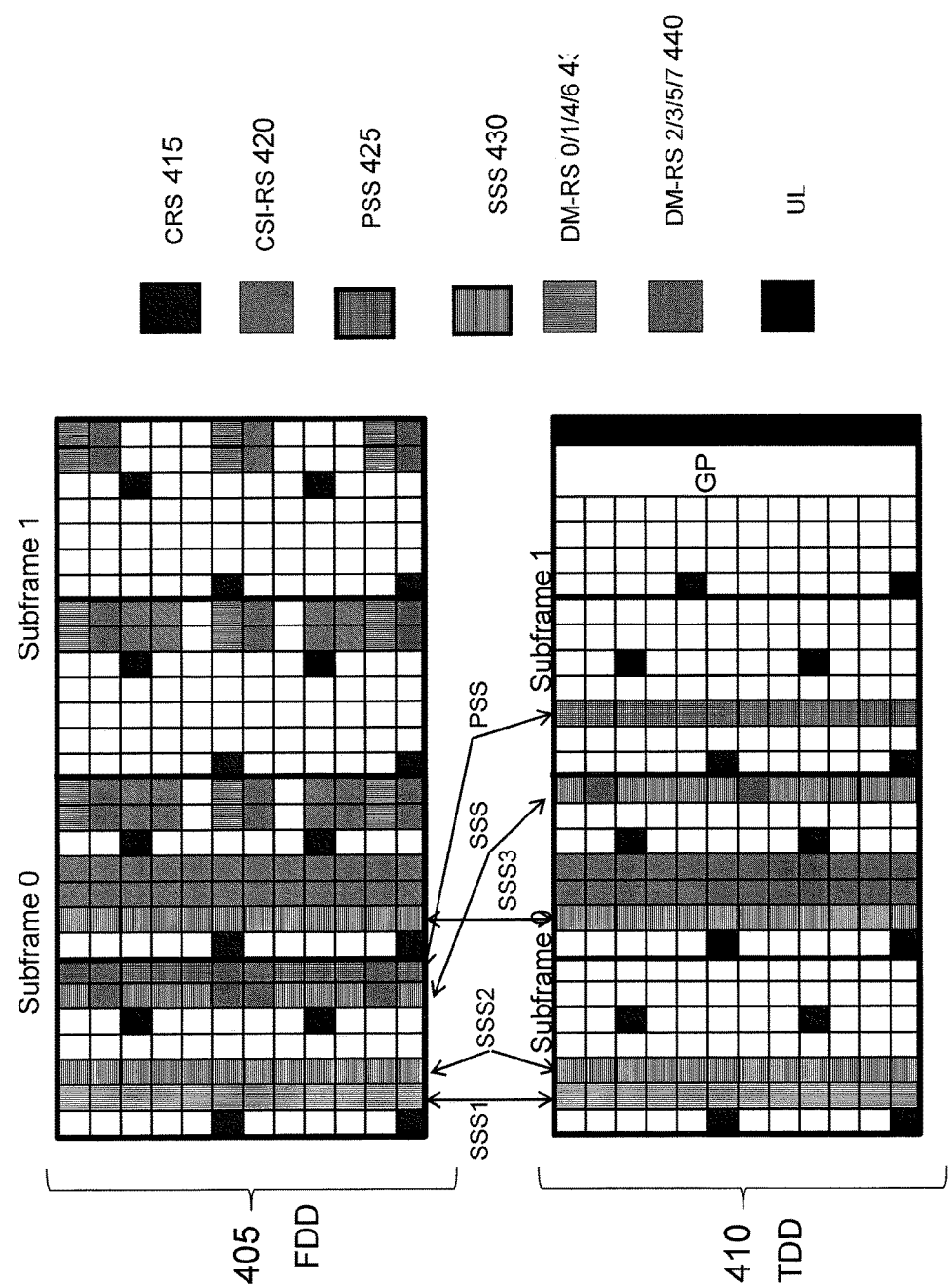
FIG. 5 is a schematic diagram illustrating reference signals, in accordance with embodiments of the present disclosure.

FIG. 5 is a schematic diagram illustrating a discovery burst with one or more additional secondary synchronization signal sequences, in accordance with embodiments of the present disclosure. As shown in FIG. 5, three additional SSS sequences, labeled SSS1, SSS2 and SSS3 are included in the discovery burst, which consists of subframe 0. In certain embodiments, the SSS sequences may not be distinct. For example, SSS3 may in some cases be the same as SSS2 in the subframe.

In FIG. 5, the three additional SSS sequences, SSS1, SSS2 and SSS3 are included in the discovery burst comprising subframe 0. In certain embodiments, the locations of the additional sequences may be chosen so that the relative distance between any of the new SSS sequences and the PSS does not match the expected relative distance for the legacy PSS and SSS for either the FDD or TDD configurations. Choosing these locations of the additional sequences may preclude any problems legacy UEs 110 may have due to transmission of the additional SSS sequences. The additional SSS sequences may be used by UE 110 for cell identification, time and frequency synchronization, and RRM measurements, including RSRP and RSRQ measurements.

In certain embodiments, UE 110 may utilize the multiple SSS sequences to perform cell identification and RRM measurements by coherently combining all the SSS sequences within a subframe. Such an approach may result in enhanced sensitivity against noise due to increased processing gain. Additionally, network 100 may configure UE 110A to report cell IDs based only on some of the transmitted SSS sequences. For example, four SSS sequences may be transmitted by the network node, but UE 110A may be asked to report the cell ID based only on SSS and SSS1 along with the PSS. Some of the SSS may be repeated. For example, in certain embodiments SSS2 and SSS3 may be the same as SSS1.

Another approach, instead of simple repetition of some or all SSSs to increase coverage, is to define some predefined relationship between the cell IDs used by all SSSs. As part of such an approach, UE 110 may apply one or more predefined rules that, based on the derived cell IDs from SSSs, UE 110 can apply to determine which cell IDs are the actual cell IDs and which cell IDs may be auxiliary ones where their corresponding SSSs can be used for coverage enhancement. Such an approach may have the benefit that some randomness is created by these SSSs. The repetition can be considered a simple variation of this approach.

When UE 110A is configured to measure on a discovery signal, it may report two sets of RRM measurements. One of the RRM measurements may be performed on the original PSS/SSS, and the other one may be performed on the additional SSS. The reason for this is that UE 110 may not be able to distinguish the PSS/SSS from multiple transmission points, but may be capable of doing it for the additional SSS.

As described above, the RRM measurements normally contain both RSRP and RSRQ measurements. The RRM measurements may also be UE Rx-Tx time difference, which is performed on PSS/SSS in DL and SRS in UL. UE 110 would be able to measure RSRP on either the PSS/SSS or the additional SSS. Alternatively, UE 110 may perform a combined measurement of all the synchronization signals.

For the RSRQ, UE 110 would need to measure the RSSI, which includes the total received power including the interference and thermal noise. In order to have an interference estimate of the channel, the interference measurement can be defined in different ways. One way in which the interference measurement can be defined is for UE 110 to measure the RSSI in one or several OFDM symbols in the subframe that the discovery signal is transmitted. This approach assumes that it is possible for neighbor cells to perform transmissions in those subframes.

An alternative approach to defining the interference measurement is that the RSSI and the interference measurement may be performed in subframes other than the subframes in which the discovery signal is transmitted. These subframes or resources may be explicitly configured by network 100.

As yet another alternative, it may be that UE 110 is not allowed to do the interference measurement in any subframe in which a discovery signal is transmitted. If the subframe for interference measurement is configured by the network node, the configuration may be any suitable configuration. For example, the configuration may be an indication of an explicit subframe(s) that is used for interference and RSSI measurements with a given periodicity. As another example, UE 110 may be configured with one or a set of CSI-IM resources where it measures the RSSI and the interference.

In certain embodiments, the discovery burst may be transmitted in multiple subframes. For example, the discovery signals may be transmitted over consecutive subframes. However, if the legacy PSS and SSS are transmitted over consecutive subframes, this may result in some problems for legacy UEs that do not expect such a sequence of synchronization signals. To avoid this, when the discovery burst is transmitted over multiple subframes, the discovery burst may be defined so that only the additional SSS sequences, SSS1, SSS2 etc. and/or the CRS and CSI-RS are transmitted in the subframes other than subframe 0 and subframe 5. Since legacy UEs look for the SSS after first detecting the PSS, the transmission of these additional SSS sequences will occur in locations that the legacy UE will not inspect, thus avoiding problems for legacy UEs.

In certain embodiments, the CSI-RS may be used as the discovery signal. Thus, the CSI-RS may be used, in addition to CSI feedback, for cell identification and RRM measurements (additional SSS sequences are not used). The CSI-RS is specific to the radio node that transmits it (e.g., transmission point, RH, eNode). The information about the configured CSI-RS is signaled to UE 110 for performing measurements. The number of CSI-RS configurations in terms of the REs utilized is quite large (up to 20), which can be used to minimize interference since the reuse factor is effectively 20. However, the currently defined CSI-RS, in its minimal configuration, only has two REs per RB, which can still lead to poor performance in some situations.

In certain embodiments, UE 110 may be configured with multiple CSI-RS configurations within a single subframe in a radio node, and may be signaled that all the CSI-RS configurations are quasi-co-located with respect to all properties, including time and frequency synchronization, delay spread and Doppler spread. This indicates to UE 110 that these CSI-RS configurations can be coherently combined, which allows UE 110 to improve detection performance. Notably, this increase in performance comes with a decrease in the reuse factor, which can be used to minimize interference from other cells. That is, if UE 110 is configured with two CSI-RS configurations in a subframe, then there will only be 9 remaining unique pairs of CSI-RS that can be assigned to other cells, instead of the 19 that would be available if UE 110 was assigned only one CSI-RS configuration.

The use of multiple CSI-RS configurations in the same node 115 may enhance performance of the measurements done on the CSI-RS by UE 110. The measurement performance with multiple CSI-RS configurations may be especially enhanced under certain conditions. For example, the performance of measurements may be especially enhanced where there are conditions of low signal quality (such as SINR e.g., −3 dB or lower) at UE 110, high interference at UE 110, and at medium or high UE speed (e.g., Doppler speed above 30 Hz).

Network node 115 may dynamically or semi-statically change the configuration of CSI-RS transmission in one or more radio nodes 115. The configuration change may be based on any suitable criteria. As one example, the configuration change may be based on signal quality (e.g., RSRQ, SINR, BLER etc.) experienced by one or more UEs 110 in a cell served by a radio node 115. As another example, the configuration change may be based on a location of one or more UEs 110 in a cell served by a radio node 115. As yet another example, the configuration change may be based on a UE speed (e.g., Doppler) of one or more UEs 110 in a cell served by a radio node 115.

For example, if the UE speed of at least N number of UEs 110 is above a threshold (e.g., 30 Hz of Doppler), and/or if the received signal quality of at least M number of UEs 110 is below a threshold (e.g., SINR below −3 dB), then network node 115 may configure multiple CSI-RS processes, such as 2 CSI-RS processes in the same node. Otherwise, network node 115 may configure only legacy (single CSI-RS process). Network node 115 (e.g., a serving eNode B) may communicate the selected and configured CSI-RS process to UE 110, thus enabling UE 110 to perform measurements.

In certain embodiments, UE 110 may also indicate to the serving network node 115 its preference or recommendation in terms of the number of CSI-RS processes that need to be configured at one or more transmitting network nodes 115. UE 110 may decide this based on the signal quality measured in those radio nodes (e.g., SINR, RSRQ, etc.) based on CSI-RS. For example, if signal quality is low, UE 110 may recommend to use multiple processes of CSI-RS in that radio node. The receiving network node 115, in response to receiving the indication from UE 110, may use the received information and configure the number of CSI-RS processes (e.g., 1, 2 or 4) in the radio node. The network node 115 may also use indications received from a plurality of UEs 110 when configuring or modifying the configured CSI-RS processes.

Network node 115 may decide whether to configure a single CSI-RS process in a radio node or multiple CSI-RS processes, and also the number of processes (e.g., 2 or 4), based on any suitable criteria, such as the criteria described above. The network node may make the decision based on criteria evaluated by network node 115 itself, and also based on a recommendation received from UE 110. For example, network node 115 may select the number of CSI-RS processes, which may be any suitable function of the CSI-RS processes determined by network node 115 (K) and processed recommended by UE 110 (L). For example, the function may be a minimum (K, L), a maximum (L, K), a mean (K, L), or any other suitable function.

Furthermore, the possibility to have different cell IDs due to multiple SSSs, enabling configuration of multiple CSI-RS coupled to a single cell ID or multiple cell IDs. For example, the cell ID derived from PSS and SSS can be used for CSI-RS.

In certain embodiments, UE 110 may signal capability information to another node, such as network node 115, to inform network node 115 whether UE 110 is capable of obtaining, acquiring, or using multiple SSS signals and/or multiple CSI-RS processes for performing one or more radio measurements. More specifically, the capability information may indicate whether UE 110 has the ability to use any of the signals and procedures described above. Capability information may be sent in any suitable manner. For example, capability information may be sent via RRC signaling to network node 115. Capability information may be sent at any suitable point. For example, the capability information may be sent during initial call setup, after cell change, or during the session or call.

Capability information may contain any suitable information, and in certain embodiments the capability information may contain additional or more specific information. For example, the capability information may include information as to whether UE 110 is capable of using multiple SSS and/or multiple CSI-RS processes for performing particular types of measurements, such as RSRP, RSRQ, etc. As another example, the capability information may include information as to whether UE 110 is capable of using multiple SSS and/or multiple CSI-RS processes for performing measurements in a specific deployment scenario or configuration, such as when the same cell ID (e.g., PCI) is used in more than one cell.

Network node 115 may use the acquired UE capability information for performing any suitable radio operation tasks or network management tasks. As one example, network node 115 may forward the received capability information to another network node, which may use it after cell change of UE 110. As another example, network node 115 may decide based on the received capability information, whether to configure multiple SSS signals and/or multiple CSI-RS in a radio node or not.

Figure 6:
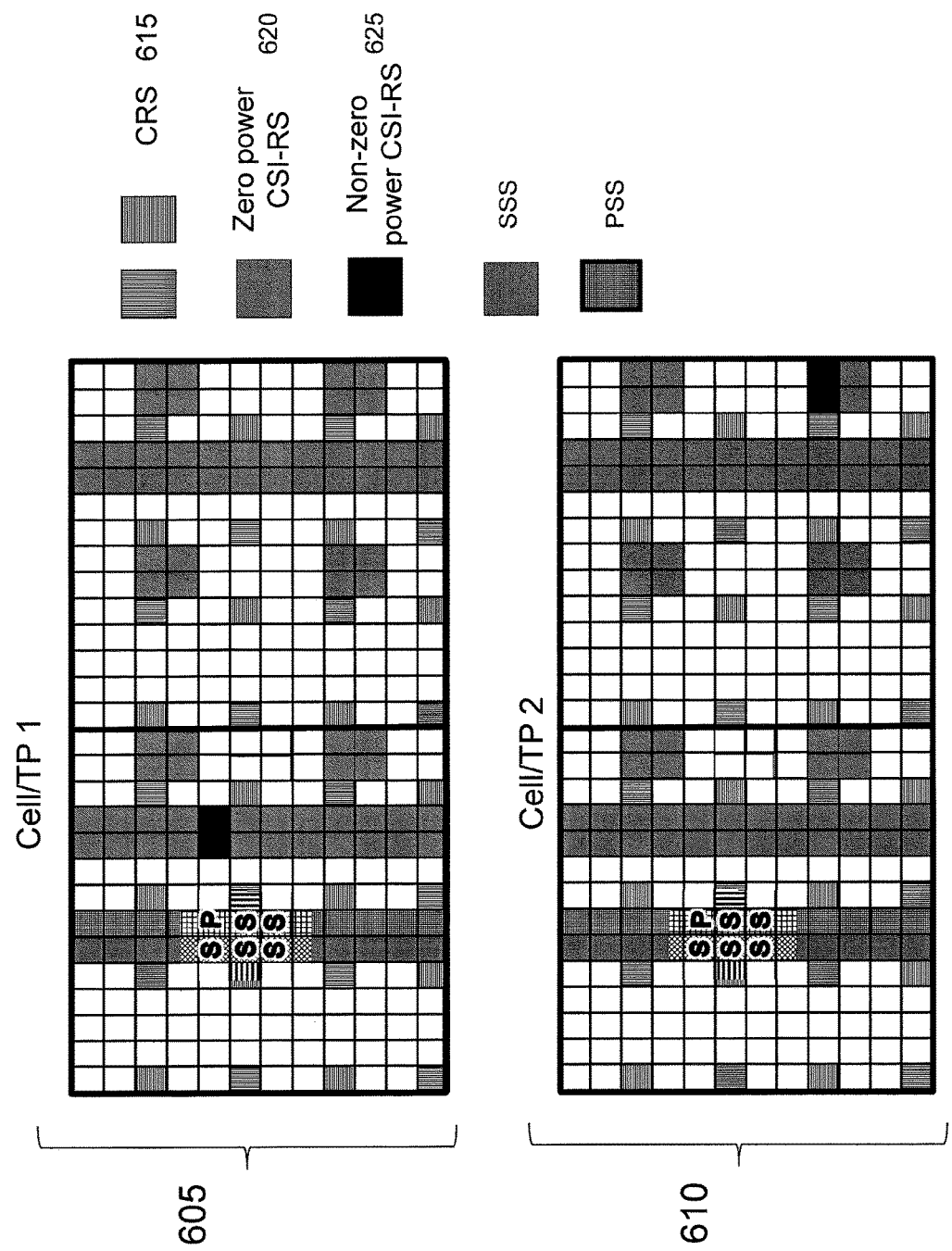
FIG. 6 is a schematic diagram illustrating a discovery signal, in accordance with certain embodiments.

FIG. 6 is a schematic diagram illustrating a discovery signal, in accordance with certain embodiments. As illustrated in FIG. 6, the discovery signal may be part of a discovery burst of N<=5 subframes every M subframes (e.g., 40, 80, 160). As described above, the discovery burst may contain multiple signals. The discovery burst illustrated in FIG. 6 includes PSS/SSS, and CSI-RS configurations, with and without zero power. In certain embodiments, and as illustrated in FIG. 6, the SSS may be included in the first subframe. The multiple signals of the discovery burst may be used for any suitable function. For example, the multiple signals of the discovery burst may be used for Cell ID (PSS/SSS/CRS), TP ID (CSI-RS), RSRP (CRS, CSI-RS), RSRQ (CRS), and time/frequency tracking (CRS).

Figure 7:
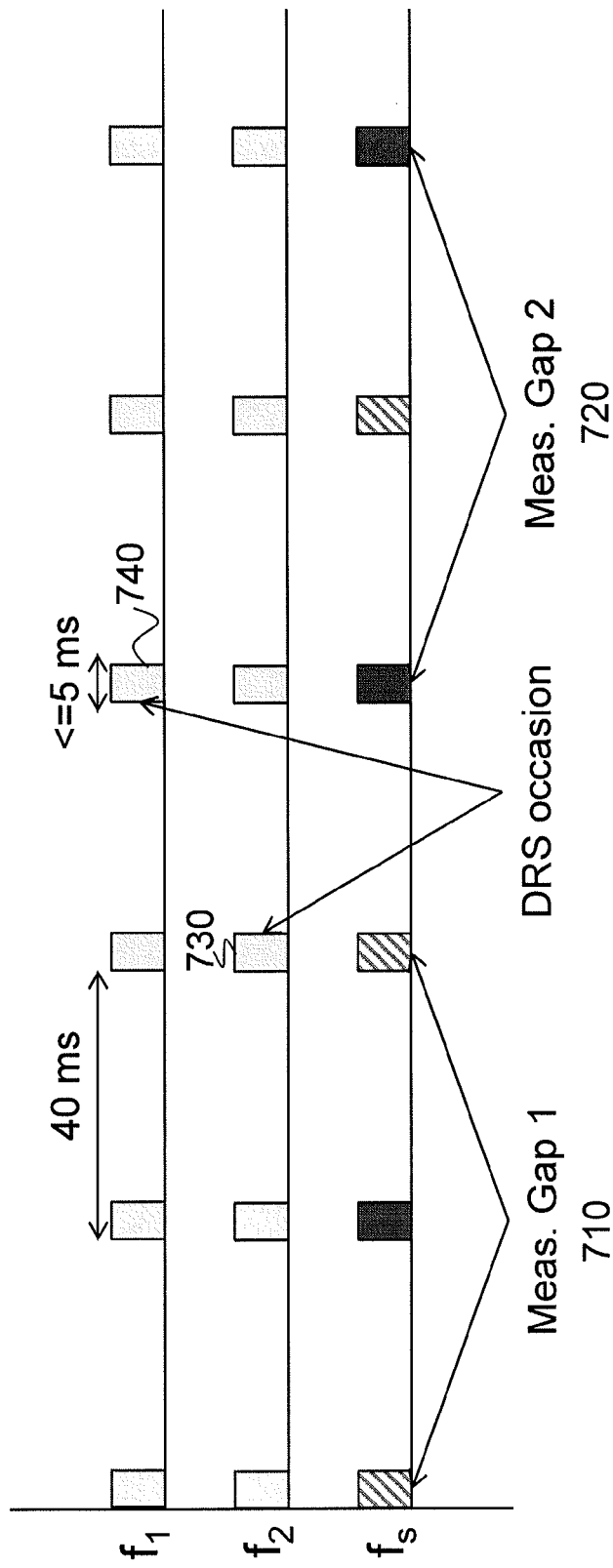
FIG. 7 is a schematic diagram illustrating discovery signal measurements with two measurement gaps, in accordance with certain embodiments.

FIG. 7 is a schematic diagram illustrating DRS measurements and measurement gaps with two measurement gaps, in accordance with certain embodiments. More particularly, FIG. 7 illustrates measurement gaps 710 and 720, and DRS occasions 730 and 740. In certain embodiments, there may be only one measurement gap per UE. The measurement gap may be any suitable time period. For example, and as illustrated in FIG. 7, measurement gaps 710 and 720 may be 80 ms. DRS occasions 730 and 740 may be any suitable duration. For example, the DRS period of DRS occasions 730 and 740 may be 40 ms. In certain embodiments, DRS measurement may be used in various ways. For example, DRS measurement may be used for handover trigger, CA SCell configuration (addition, activation, deactivation, and/or release), and TP selection in the shared cell scenario. In certain embodiments, it may be desirable to avoid having all UEs, such as UE 110 described above in relation to FIG. 5, being unavailable for scheduling.

Figure 8:
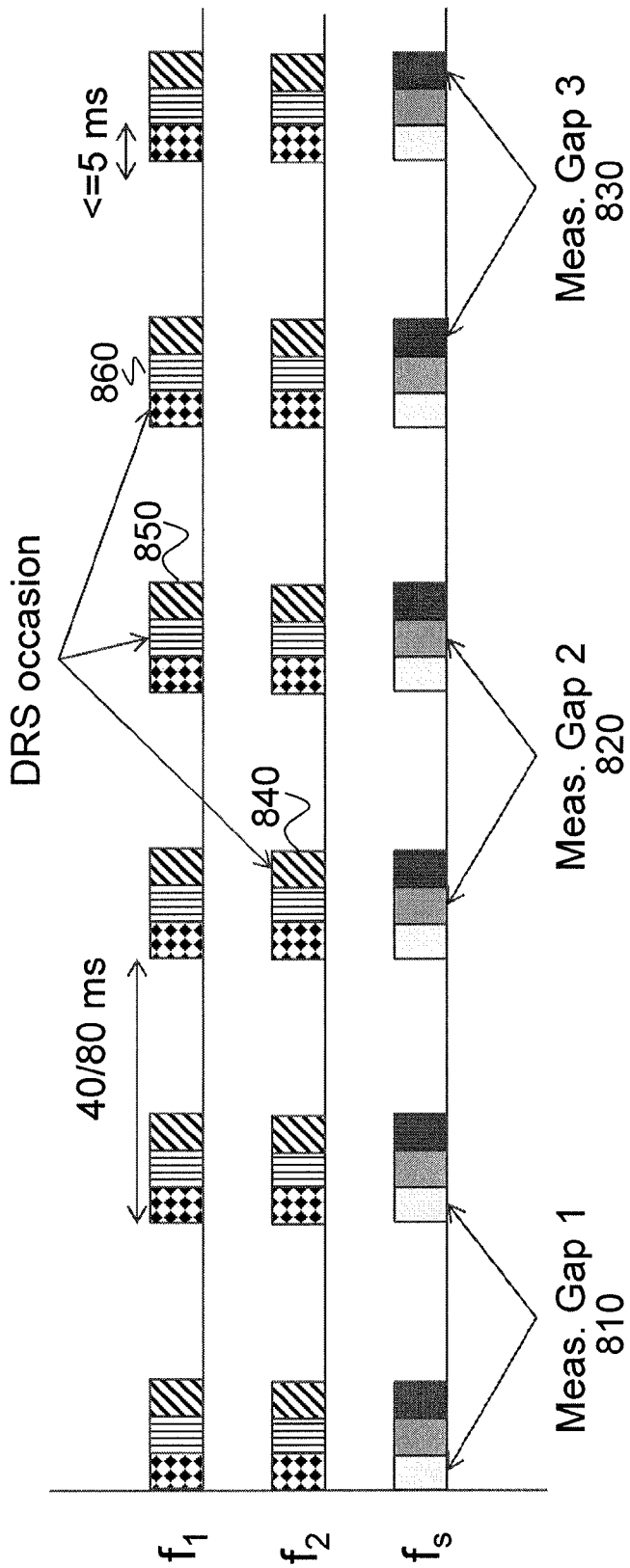
FIG. 8 is a schematic diagram illustrating discovery signal measurements with three measurement gaps, in accordance with certain embodiments.

FIG. 8 is a schematic diagram illustrating DRS measurements and measurement gaps with three measurement gaps and multiple UE groups, in accordance with certain embodiments. More particularly, FIG. 8 illustrates measurement gaps 810, 820, and 830, and DRS occasions 840, 850, and 860. In the example illustrated in FIG. 8, the measurement gap period may be 40/80 ms, and the DRS period may be 40/80/160 ms.

As described above, multiple synchronization signals may be included as part of a discovery signal design. However, since the discovery signal creates a new procedure and potentially a new signal, it is also desirable if it can address some other needs as well. One such need is the ability to improve the sensitivity of the cell detection mechanism at very low signal levels. This may be useful, for example, for machine type devices that may be situated in locations with very poor signal reception. Another need is increasing the number of cell IDs that may be assigned to cells. This is particularly useful in extremely dense deployments of small cells.

Another problem is to facilitate the efficient measurement of received signal strength and quality (referred to as RSRP and RSRQ) for different transmission points within a cell. These transmission points may be geographically in separate locations but perform coordinated transmissions as a logical single cell entity. Identifying these transmission points in an efficient manner, and being able to differentiate between different hierarchies of transmission point clusters in a heterogeneous network, is very important. This aspect is not addressed very well by current cell ID and reference signal structures. As described above, a key consideration in the discovery signal design is to ensure minimal disruption to legacy UEs while providing adequate performance, and meeting all of the above goals for newer UEs.

As described above, a network node, such as an eNB, may transmit a discovery signal within a discovery burst of at least one subframe (of length 1 ms) with multiple different secondary synchronization sequences (SSS) in the subframe. The additional SSS sequences may be used for any suitable purpose. In certain embodiments, the additional SSS sequences may be used by a UE, such as UE 110 described above in relation to FIG. 4, for cell identification, time and frequency synchronization, and RRM measurements, including RSRP and RSRQ measurements. Multiple cell IDs may also be used to expand cell IDs, manage cluster hierarchies in heterogeneous networks, and manage handovers in such heterogeneous networks.

As described above, not all the SSS sequences may be distinct. For example, in certain embodiments, SSS3 may be the same as SSS2 in the subframe. Furthermore, although multiple different SSS have been described, in certain embodiments only 1 or 2 of them may be present. For example, if only 1 additional SSS is present in one cell, e.g., SSS1, the neighboring cell can use SSS2 and use RE muting on SSS1 position to avoid SSS collision. Another neighboring cell can use SSS3 and use RE muting on both SSS1 and SSS2. In certain embodiments, the position of the additional SSS may be dependent on cell ID or PSS. It is also possible to extend it beyond three SSS. For each extra SSS that is added for synchronization and detection, the measurement accuracy would improve. Furthermore, the number of additional discovery identification signals would increase as well.

In certain embodiments, the multiple SSS may be used to expand the number of cell IDs that may be assigned to cells or transmission points within a network, such as network 100 described above in relation to FIG. 4. As described above, each SSS can currently take 168 values. Therefore, the use of one additional SSS (e.g., SSS1) can expand the number of cell IDs by a factor of 168, i.e., it results in 504×168 PCI (cell ID) values. The use of three additional SSS can expand the number of cell IDs by a factor of 168×168×168, which is clearly enough for most practical networks by a wide margin.

Large cell ID expansion may not be needed in some practical networks. In such circumstances, the range of the additional SSS (e.g., SSS1) can be restricted, such that each additional SSS can take less than 168 values. For example, in certain embodiments, SSS1, SSS2 and SSS3 can be a subset of SSS. This may reduce UE processing efforts. In certain embodiments, some pattern may be defined to select and configure SSS1, SSS2 and SSS3.

Referring back to FIG. 5, one should note the placement of the additional SSS below is merely an example. The benefits with the placement below is that additional SSS does not cause detection ambiguity between existing PSS/SSS and newly added ones. Furthermore, if the CRS is used in the discovery burst signal, the possibility to have different cell IDs due to multiple SSSs may allow configuration of CRS coupled to any of these cell IDs. For example, the cell ID derived from PSS and SSS can be used for CRS.

The increased number of cell IDs can be applied a variety of ways. In certain embodiments, the increased number of cell IDs can be used to create a hierarchy of cell IDs. For example, the combination of the original PSS and SSS provides the 504 cell IDs for currently defined cells. If a cell as currently defined includes multiple geographically separated transmission points, then the additional SSS1 can be used to distinguish between the separate transmission points. Additional sequences such as SSS2 can be used to create a further nested hierarchy of transmission points.

Figure 9:
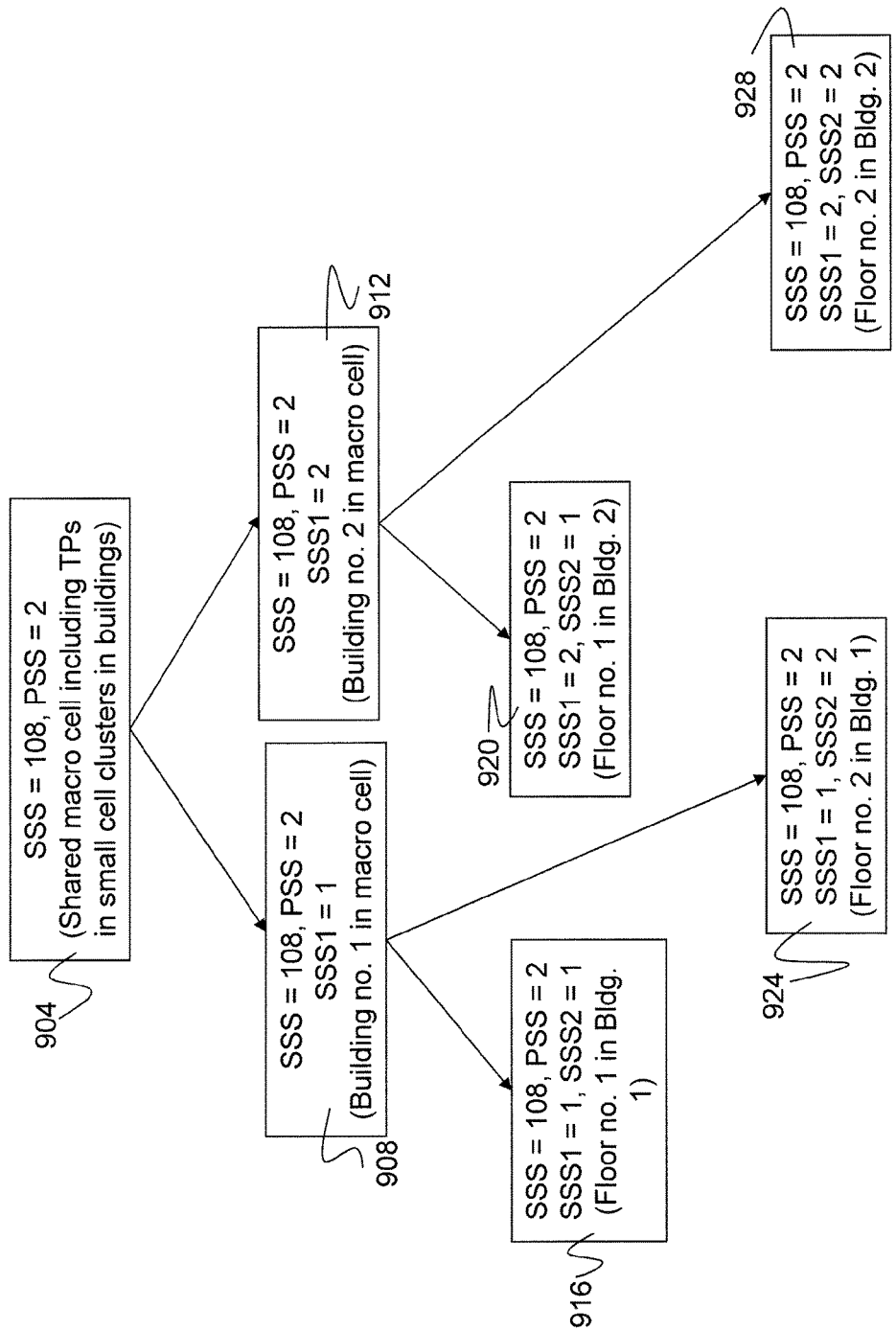
FIG. 9 illustrates a hierarchy of cell IDs created using one or more additional secondary synchronization signal sequences, in accordance with certain embodiments.

FIG. 9 illustrates a hierarchy of cell IDs created using one or more additional secondary synchronization signal sequences, in accordance with certain embodiments. FIG. 9 illustrates an example of a hierarchy of cell IDs labeling geographically separated transmission points and hierarchical clusters of transmission points within one logical shared cell. More particularly, FIG. 9 illustrates a scenario in which multiple SSSs have been used to hierarchically group transmission points within buildings located within a macro cell, and within floors in each of the buildings.

The one logical shared cell is illustrated as transmission point 904. The shared cell has SSS equal to 108, and PSS equal to 2. Transmission points 908 and 912 illustrate geographically separated transmission points within the shared macro cell of transmission point 904. In particular, transmission point 908 is a transmission point within a first building, and transmission point 912 is a transmission point within a second building. As part of the same shared cell 904, transmission points 908 and 912 have the same SSS equal to 108 and PSS equal to 2. Thus, transmission points 908 and 912 are hierarchically grouped within shared cell 904 using different SSS1 sequences. For example, transmission point 908 has SSS1 sequence equal to 1, while transmission point 912 has SSS1 sequence equal to 2.

The hierarchical relationship among transmission points within macro cell 904 is further defined within each of transmission points 908 and 912. This may be accomplished using different SSS2 sequences. For example, transmission point 908 is further divided into transmission points 916 and 924, each of which may, for example, be located on a different floor of building 1, i.e., transmission point 908. While transmission points 916 and 924 have identical SSS, PSS, and SSS1 sequences, transmission points 916 and 924 have different SSS2 sequences. Similarly, transmission point 912 is further divided into transmission points 920 and 928, each of which may, for example, be located on a different floor of building 2, i.e., transmission point 912. While transmission points 920 and 928 share the same SSS, PSS, and SSS1 sequences, transmission points 920 and 928 have different SSS2 sequences. In certain embodiments, the hierarchy within a particular transmission point may be further defined using additional SSS sequences, such as SSSS. It should be noted that the partitioning of cell IDs to cluster transmission points does not need to always use an additional SSS sequence. For example, in FIG. 9, with just one additional sequence, SSS1, a few of the SSS1 values can be assigned directly to one of the floors of building 1, and other values of SSS1 can be assigned to another floor in building 1.

Due to the ability to classify groups of nodes hierarchically using some criterion, hierarchical cell ID structures may provide a useful tool to manage various aspects of a network. As one example, the ability to classify groups of nodes hierarchically using some criterion may be useful in handover management. Throughout a network, the level of overhead for handovers may be different depending on the nodes between which the handover is being carried out. Continuing with reference to FIG. 9, when a UE is handed over from any transmission point belonging to one macro cell to a transmission point belonging to another macro cell, a regular full-fledged handover as defined in LTE today is executed. Such a handover may be detected by the UE simply by comparing the top level PSS and SSS sequences of the serving node to the corresponding ones for the target node. When one of these sequences is different, the UE may assume that the handover is being made to a different cell, and procedures such as obtaining system information from the new cell are executed.

When a UE is handed over from one transmission point to another transmission point belonging to the same macro cell, the UE may detect this via the fact that the PSS/SSS are the same for both the source and target node. For example, a UE operating within the hierarchy illustrated in FIG. 9 may require a handover from source node 908 to target node 912. The UE may determine that source node 908 and target node 912 belong to the same macro cell by detecting that the PSS/SSS of source node 908 and target node 912 are the same. In such a scenario, the UE may assume that high level system information is the same for both nodes, and therefore the UE is able to execute a more "light-weight" handover, with lower overhead and a faster transition time to the new node.

In certain embodiments, some handover procedures may be different if the source and target nodes have the same SSS and SSS1 but a different SSS2. For example, during a handover of a UE from source node 916 to target node 924, the UE may assume that the signals from the two nodes are quasi-co-located to a greater extent than would be the case if the two nodes had different SSS1 sequences. Thus, hierarchical cell IDs can be used to more efficiently manage the signaling and use of quasi-co-location (QCL) parameters in the network. To illustrate this, consider that the cells on the same floor in the building in the example of FIG. 9 may be different beam-formed cells coming from the same physical location. The network could then signal to UEs that whenever SSS and SSS1 sequences are the same between two nodes, their signals are quasi-co-located with respect to time and frequency synchronization to a very high degree of accuracy and also highly correlated with respect to delay spread and Doppler spread. When the SSS sequences are the same but the SSS1 sequence is different, the two nodes may be quasi-co-located with respect to time synchronization, but may have different delay spreads and Doppler spreads.

It will be understood to those skilled in the art that the above is merely an example, and the hierarchical cell ID structure can be used to cluster transmission points in any suitable manner and using any suitable criteria as well.

Figure 10:
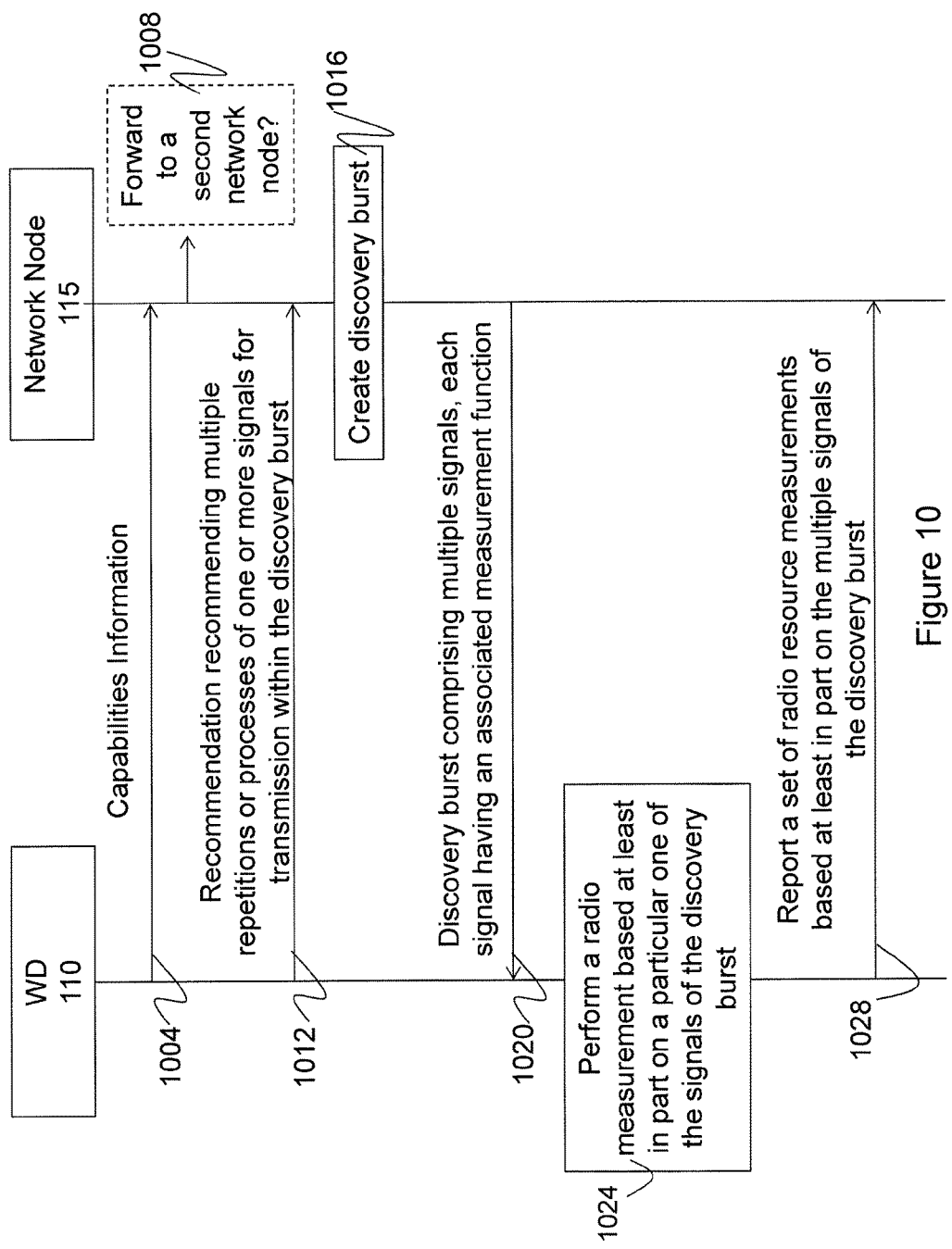
FIG. 10 is a signal flow diagram, in accordance with an embodiment.

FIG. 10 is a signal flow diagram, in accordance with an embodiment. The signal flow begins at step 1004, when a wireless device, such as wireless device 110 described above in relation to FIG. 4, communicates capability information to a network node, such as network node 115 described above in relation to FIG. 4. The capability information may indicate to network node 115 whether wireless device 110 is capable of using a discovery burst for performing one or more radio measurements. Optionally, at step 1008, the network node may forward the capability information to a second network node. At step 1012, wireless device 110 may send a recommendation to the network node. The recommendation may recommend multiple repetitions or processes of one or more signals for transmission with a discovery burst from network node 115.

At step 1016, network node 115 creates a discovery burst. The discovery burst may be created based on any suitable criteria. In certain embodiments, the one or more criteria may include a signal quality at one or more wireless devices 110, a speed of one or more wireless devices 110, a location of one or more wireless devices 110, and a recommendation received from one or more wireless devices 110.

The discovery burst may include multiple signals within at least one subframe, and each of the multiple signals may have one or more associated measurement functions. The multiple signals may include one or more of a primary synchronization signal, a secondary synchronization signal, one or more additional secondary synchronization signals, a cell-specific reference signal, and a channel state information reference symbol. The same discovery burst includes multiple repetitions of at least one of the multiple signals. For example, the same discovery burst may include multiple repetitions of at least the PSS. As another example, the same discovery burst may include multiple repetitions of at least the SSS. As yet another example, the same discovery burst may include multiple repetitions of at least one additional SSS (e.g., multiple SSS1s and/or multiple SSS2s, etc.) Similarly, the same discovery burst may include multiple repetitions of at least the CRS and/or multiple repetitions of the CSI-RS.

By sending the wireless device multiple repetitions of the same type of signal in a discovery burst, the wireless device can combine at least two of the repetitions. As one example, the wireless device may combine two PSS repetitions of the discovery burst to obtain PSS information.

In certain embodiments, the discovery burst may have a defined periodicity. The defined periodicity may be N subframes occurring once every M subframes, where N is greater than or equal to 1.

At step 1020, network node 115 transmits the discovery burst to wireless device 110. In certain embodiments, at least one of the multiple signals of the discovery burst is received by wireless device 110 with multiple repetitions within the same discovery burst, and two or more repetitions of the same type signal may be able to be combined by the wireless device. In certain embodiments, the discovery burst may be transmitted in multiple subframes.

At step 1024, wireless device 110 performs a radio measurement based at least in part on a particular one of the signals of the discovery burst. In certain embodiments, the performed at least one radio measurement may correspond to a measurement function associated with the particular signal of the discovery burst. At step 1028, wireless device 110 may report a set of radio resource measurements to the network node. The radio resource measurements may be based at least in part on the multiple signals of the discovery burst, and may include one or more of a reference signal received quality and a reference signal received power.

Figure 11:
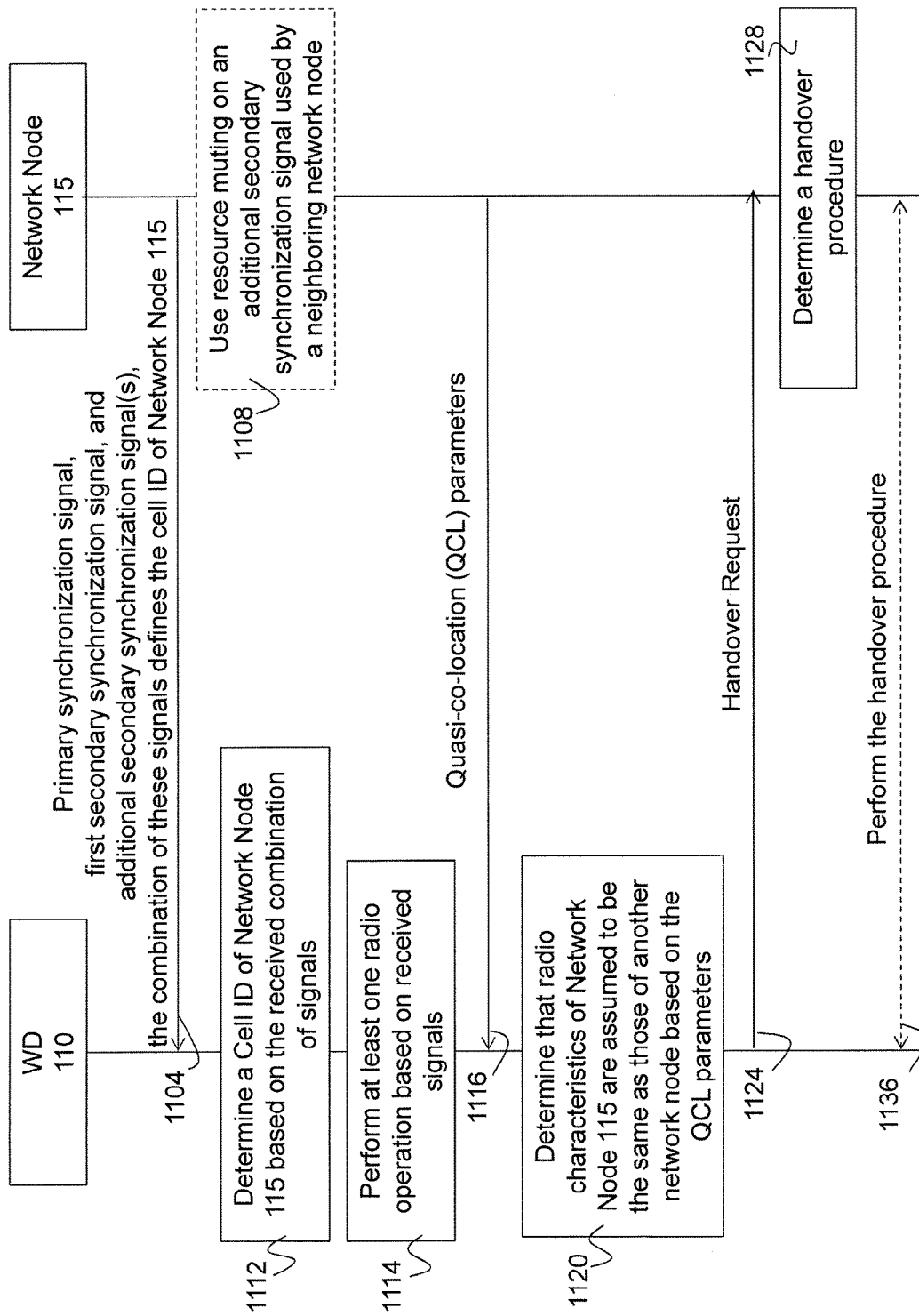
FIG. 11 is a signal flow diagram, in accordance with an embodiment.

FIG. 11 is a signal flow diagram, in accordance with an embodiment. The signal flow begins at step 1104, where a network node, such as network node 115 described above in relation to FIG. 4, creates a primary synchronization signal, a first secondary synchronization signal, and one or more additional secondary synchronization signals, and transmits the created primary synchronization signal, first secondary synchronization signal, and one or more additional secondary synchronization signals to a wireless device, such as wireless device 110 described above in relation to FIG. 4.

In certain embodiments, the combination of the primary synchronization signal, first secondary synchronization signal, and one or more additional secondary synchronization signals defines the cell ID of network node 115. The cell ID may be one of a number (N) of possible cell IDs. In certain embodiments, N may be determined by multiplying a number of possible values for the primary synchronization signal, a number of possible values for the first secondary synchronization signal, and for each additional secondary synchronization signal, a number of possible values for the additional secondary synchronization signal, such that N is greater than a legacy number of possible cell IDs. The legacy number of possible cell IDs may be determined by multiplying the number of possible values for the primary synchronization signal and the number of possible values for the first secondary synchronization signal. For example, in certain legacy systems, the number of possible cell IDs equals 504 (i.e., 3 PSS values×168 SSS values=504 possible legacy cell IDs).

At step 1108, network node 115 may perform resource muting on one or more additional secondary synchronization signal used by a neighboring network node. For example, if network node 115 uses SSS1 and a neighboring network node uses SSS2, network node 115 can use resource muting on the SSS2 position to avoid an SSS collision.

At step 1112, wireless device 110 determines a Cell ID of the network node based on the received combination of signals. In certain embodiments, the primary synchronization signal, first secondary synchronization signal, and one or more additional secondary synchronization signals may be discovery signals of a discovery burst. In certain embodiments, the one or more secondary synchronization signals may indicate a position of network node 115 within a hierarchy of network nodes under a shared cell, an example of which was described with respect to FIG. 9 above.

At step 1116, network node 115 may communicate quasi-co-location management parameters to wireless device 110. In certain embodiments, the quasi co-location management parameters may indicate to wireless device 110 when, based on the value of the one or more additional secondary synchronization signals, radio characteristics of network node 115 can be assumed to be the same as those of another network node under the shared cell. As an example, in certain embodiments, the UE may assume that the signals from two nodes under the shared cell are quasi-co-located to a greater extent if the two nodes have the same SSS1 sequence and that the signals from the two nodes are quasi-co-located to a lesser extent (or not quasi-co-located) if the two nodes have different SSS1 sequences.

At step 1120, wireless device 110 may determine that radio characteristics of network node 115 may be assumed to be the same as those of another network node, based on the quasi-co-location parameters. Examples of radio characteristics that may be assumed to be the same in a quasi-co-location scenario include time and frequency synchronization, delay spread, and/or Doppler spread.

At step 1124, wireless device 110 communicates to network node 115 a request for a handover from network node 115 to a target node. At step 1128, network node 115 determines a handover procedure.

In certain embodiments, the handover request may be a request to be handed over to a target node under the shared cell, and the network node may determine a handover procedure to use based on the target node's cell ID. In such an embodiment, the handover procedure may be more complex if all of the additional secondary synchronization signals of network node 115 differ from those in the target node's cell ID, and less complex if at least some of the additional secondary synchronization signals of network node 115 are the same as those in the target node's cell ID. Referring to FIG. 9 as an example, nodes 920, 924, and 928 are each under shared cell SSS=108, PSS=2. Suppose node 920 is the current node and the target node can be either node 924 or node 928. Target node 924 is located in a different building and has a different SSS1 (SSS1=1) than the current node 920 (SSS1=2). Target node 928 is located in the same building and has the same SSS1 (SSS1=2) as the current node 920. Thus, a handover procedure from current node 920 to target node 924 may be more complex than a handover procedure to target node 928.

In certain embodiments, the handover request may be a request to be handed over to a target node, and the determined handover procedure may be more complex if the target node's cell ID indicates that the target node is outside of the shared cell, and less complex if the target node's cell ID indicates that the target node is under the shared cell. Referring to FIG. 9 as an example, a handover from current node 920 to any target node under the shared cell (e.g., any node for which the cell ID includes SSS=108, PSS=2) may be less complex than handovers to an outside target node. As one example, a cell ID that includes SSS=504 and PSS=1 would be outside of current node 920's shared cell.

At step 1136, wireless device 110 performs a handover according to the handover procedure network node 115 selects based on the target node's cell ID.

Although terminology from 3GPP LTE may be used throughout this disclosure, it is by way of example only, and should not be seen as limiting the scope of the disclosure to only the aforementioned system. Other wireless systems, including WCDMA, HSPA, WiMax, WiFi, WLAN, and GSM/GERAN, may also benefit from the various embodiments of the present disclosure. Additionally, the various embodiments described herein may be applicable in to wireless systems implementing License Assisted Access (LAA).

Terminology such as eNodeB and UE should be considering non-limiting, and does not imply a certain hierarchical relation between the two. In general, "eNodeB" could be considered as device 1 and "UE" device 2, and these two devices communicate with each other over some radio channel. Similarly, although the various embodiments may be described in the context of transmissions in the downlink, the present disclosure is equally applicable in the uplink. Additionally, while embodiments may be described in the context of single carrier operation of the UE, the embodiments are applicable to multi-carrier or carrier aggregation operation of the UE as well. Thus, the embodiment can be carried out independently for each cell on each carrier frequency supported by the network node.

Figure 12:
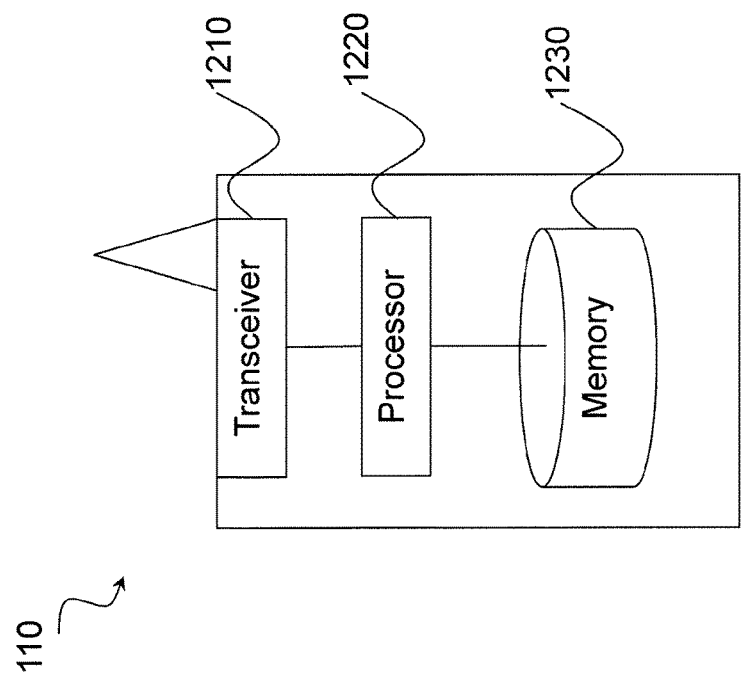
FIG. 12 a block schematic of an exemplary wireless device suitably operative in accordance with certain embodiments.

FIG. 12 a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 1210, processor 1220, and memory 1230. In some embodiments, transceiver 1210 facilitates transmitting wireless signals to and receiving wireless signals from network node 115 (e.g., via an antenna), processor 1220 executes instructions to provide some or all of the functionality described above as being provided by wireless device 110, and memory 1230 stores the instructions executed by processor 1220.

Processor 1220 may include any suitable combination of hardware and software implemented in one or more modules to execute instructions and manipulate data to perform some or all of the described functions of wireless device 110. In some embodiments, processor 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 12 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may receive a discovery burst from a network node, and may perform at least one radio measurement based at least in part on a particular one of the signals of the discovery burst. As another example, the determining module may receive, from the network node, a primary synchronization signal, a first secondary synchronization signal, and one or more additional secondary synchronization signals, and determine the cell ID of the network node from the combination of signals. As another example, the determining module may perform at least one radio measurement based at least in part on the received primary synchronization signal, first secondary synchronization signal, and one or more additional secondary synchronization signals. In certain embodiments, the determining module may perform a handover according to a handover procedure selected by a network node.

The determining module may include or be included in processor 1220. The determining module may include analog and/or digital circuitry configured to perform any of the functions of the determining module and/or processor 1220. The functions of the determining module described above may, in certain embodiments, be performed in one or more distinct modules.

The communication module may perform the transmission functions of wireless device 110. The communication module may transmit messages to one or more of network nodes 115 of network 100. For example, the communication module may communicate capability information to a network node, report a set of radio resource measurements to a network node, and/or send a recommendation to a network node recommending multiple repetitions or processes of one or more signals for transmission within a discovery burst. As another example, the communication module may communicate to a network node a request for a handover from the network node to a target node. The communication module may include a transmitter and/or a transceiver, such as transceiver 1210. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may receive a discovery burst from one or more of network nodes 115 of network 100. As another example, the receiving module may receive, from a network node, a primary synchronization signal, a first secondary synchronization signal, and one or more additional secondary synchronization signals. As yet another example, the receiving module may receive quasi-co-location management parameters. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 13:
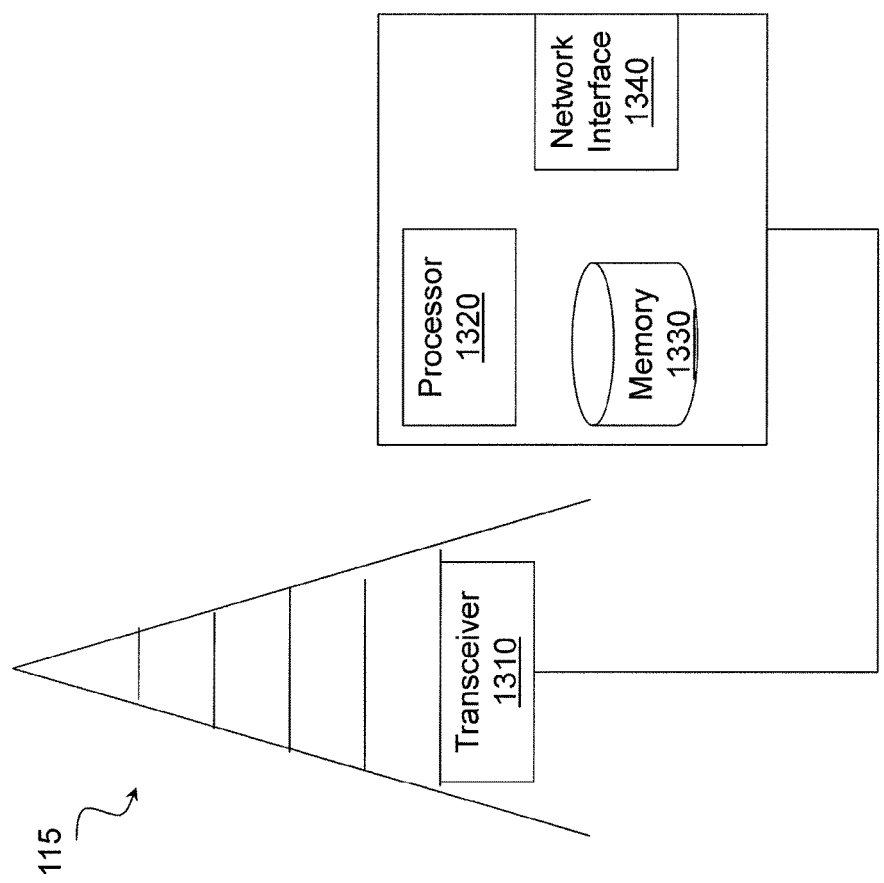
FIG. 13 is a block schematic of an exemplary radio network node suitably operative in accordance with certain embodiments.

FIG. 13 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogenous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1310, processor 1320, memory 1330, and network interface 1340. In some embodiments, transceiver 1310 facilitates transmitting wireless signals to and receiving wireless signals from wireless device 110 (e.g., via an antenna), processor 1320 executes instructions to provide some or all of the functionality described above as being provided by a network node 115, memory 1330 stores the instructions executed by processor 1320, and network interface 1340 communicates signals to backend network components, such as a gateway, switch, router, Internet, Public Switched Telephone Network (PSTN), core network nodes 130, radio network controllers 120, etc.

Processor 1320 may include any suitable combination of hardware and software implemented in one or more modules to execute instructions and manipulate data to perform some or all of the described functions of network node 115. In some embodiments, processor 1320 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1340 is communicatively coupled to processor 1320 and may refer to any suitable device operable to receive input for network node 115, send output from network node 115, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

In certain embodiments, network node 115 may include a discovery burst module, a cell ID module, a communication module, a receiving module, a determining module, and any other suitable modules. In some embodiments, one or more of the discovery burst module, cell ID module, communication module, receiving module, determining module, or any other suitable module may be implemented using one or more processors 1320 of FIG. 13.

In general, the discovery burst module may create a discovery burst based on one or more criteria. The cell ID module may create a primary synchronization signal, a first secondary synchronization signal, and one or more additional secondary synchronization signals.

The communication module may perform the transmission functions of network node 115. The communication module may transmit messages to one or more of wireless devices 110. For example, the communication module may communicate to a wireless device the discovery burst. As another example, the communication device may transmit the combination of signals created by the cell ID module. As yet another example, the communication module may communicate quasi-co-location management parameters to the wireless device. The communication module may include a transmitter and/or a transceiver, such as transceiver 1310. The communication module may include circuitry configured to wirelessly transmit messages and/or signals. In particular embodiments, the communication module may receive messages and/or signals for transmission from the discovery burst module, cell ID module, or determining module.

The receiving module may perform the receiving functions of network node 115. The receiving module may receive any suitable information from a wireless device. For example, the receiving module may receive a set of radio resource measurements from the wireless device, and/or receive capability information from the wireless device. As another example, the receiving module may receive a request for a handover from the network node to a target node. The receiving module may include a receiver and/or a transceiver. The receiving module may include circuitry configured to wirelessly receive messages and/or signals. In particular embodiments, the receiving module may communicate received messages and/or signals to the determining module.

The determining module may perform the processing functions of network node 115. For example, the determining module may perform one or more radio operations based in part on the received capability information. As another example, the determining module may determine a handover procedure to use based on a target node's cell ID. In certain embodiments, the functions of two or more of the various modules may be combined into a single module.

Other embodiments of network node 115 may include additional components beyond those shown in FIG. 13 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 14:
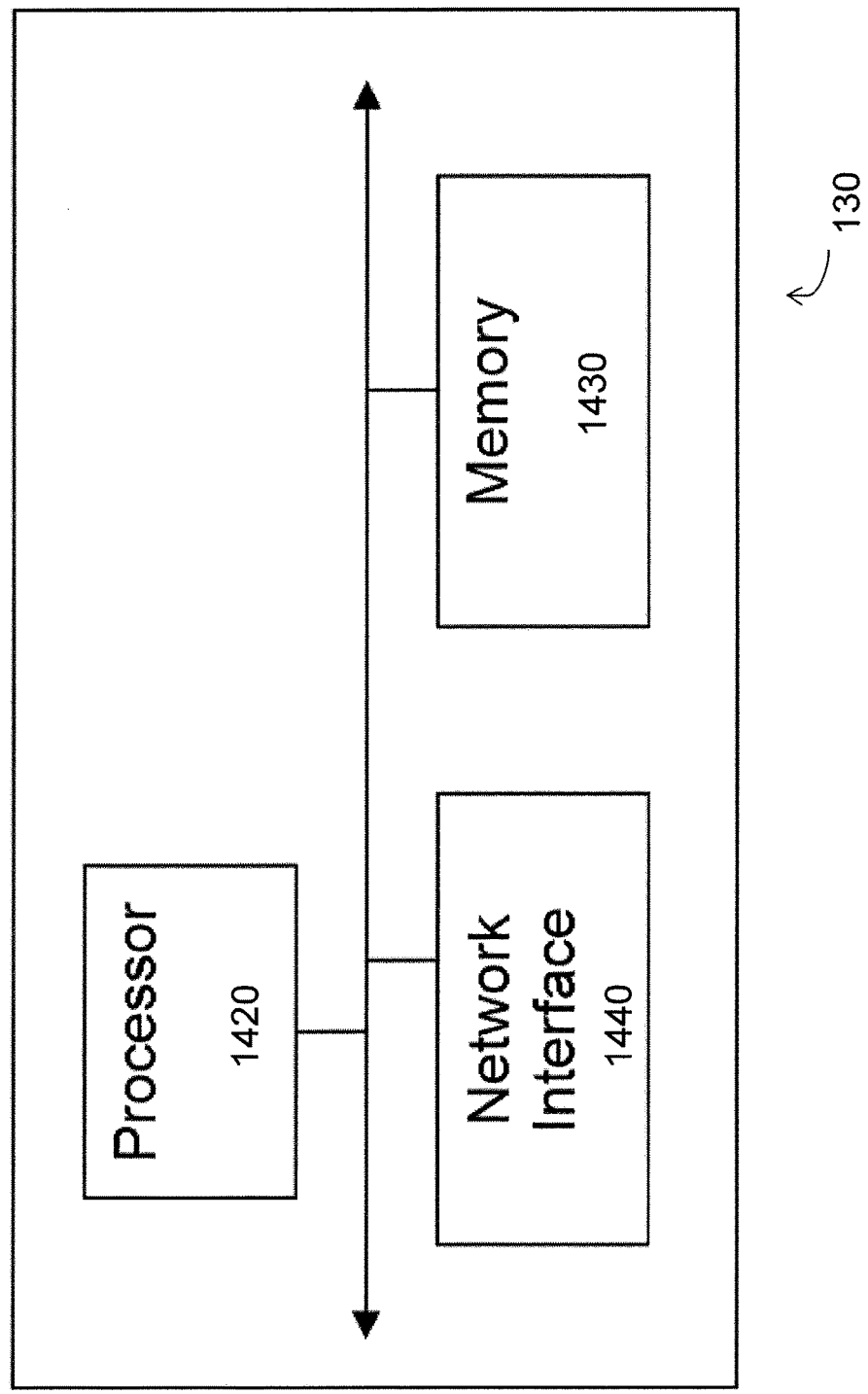
FIG. 14 is a block schematic of an exemplary core network node, in accordance with certain embodiments.

FIG. 14 is a block schematic of an exemplary radio network controller 120 or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller 120 or core network node 130 include processor 1420, memory 1430, and network interface 1440. In some embodiments, processor 1420 executes instructions to provide some or all of the functionality described above as being provided by the network node, memory 1430 stores the instructions executed by processor 1420, and network interface 1440 communicates signals to any suitable node, such as a gateway, switch, router, Internet, Public Switched Telephone Network (PSTN), network nodes 115, radio network controllers 120, core network nodes 130, etc.

Processor 1420 may include any suitable combination of hardware and software implemented in one or more modules to execute instructions and manipulate data to perform some or all of the described functions of the radio network controller 120 or core network node 130. In some embodiments, processor 1320 may include, for example, one or more computers, one or more central processing units (CPUs), one or more microprocessors, one or more applications, and/or other logic.

Memory 1430 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1440 is communicatively coupled to processor 1420 and may refer to any suitable device operable to receive input for the network node, send output from the network node, perform suitable processing of the input or output or both, communicate to other devices, or any combination of the preceding. Network interface 1440 may include appropriate hardware (e.g., port, modem, network interface card, etc.) and software, including protocol conversion and data processing capabilities, to communicate through a network.

Other embodiments of the network node may include additional components beyond those shown in FIG. 14 that may be responsible for providing certain aspects of the network node's functionality, including any of the functionality described above and/or any additional functionality (including any functionality necessary to support the solution described above).

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method in a wireless device, comprising:
receiving a discovery burst from a network node, the discovery burst comprising multiple signals associated with the network node and received within at least one subframe, each of the multiple signals having one or more associated measurement functions, and wherein the discovery burst comprises N subframes occurring with a periodicity of once every M subframes, where N is greater than or equal to 1 and where M is greater than or equal to 10;
performing at least one radio measurement based at least in part on a particular one of the signals of the discovery burst, the performed at least one radio measurement corresponding to a measurement function associated with the particular signal of the discovery burst; and
sending a recommendation to the network node, the recommendation recommending multiple repetitions or processes of one or more signals for transmission within the discovery burst from the network node.

2. The method of claim 1, wherein at least one of the multiple signals is received with multiple repetitions within the same discovery burst and two or more repetitions of the same type of signal is combined by the wireless device.

3. The method of claim 2, wherein the received multiple signals of the same discovery burst comprising one or more of a primary synchronization signal, a secondary synchronization signal, a cell-specific reference signal, and a channel state information reference symbol.

4. The method of claim 1, further comprising:
reporting, to a network node, a set of radio resource measurements, the radio resource measurements based at least in part on the multiple signals of the discovery burst and comprising one or more of a reference signal received quality and a reference signal received power.

5. The method of claim 1, further comprising:
communicating capability information to a network node, the capability information indicating to the network node whether the wireless device is capable of using the discovery burst for performing at least one radio measurement.

6. The method of claim 1, wherein the received multiple signals comprises of one or more of a cell-specific reference signal and a channel state information reference symbol, and the multiple signals are received in subframes other than subframes 0 and 5.

7. The method of claim 1, wherein the radio measurement is based only on the signals occurring within the discovery burst.

8. A wireless device, comprising:
an interface configured to receive a discovery burst from a network node, the discovery burst comprising multiple signals associated with the network node and received within at least one subframe, each of the multiple signals having one or more associated measurement functions, and wherein the discovery burst comprises N subframes occurring with a periodicity of once every M subframes, where N is greater than or equal to 1 and where M is greater than or equal to 10;
one or more processors configured to perform at least one radio measurement based at least in part on a particular one of the signals of the discovery burst, the performed at least one radio measurement corresponding to a measurement function associated with the particular signal of the discovery burst; and
send a recommendation to the network node, the recommendation recommending multiple repetitions or processes of one or more signals for transmission within the discovery burst from the network node.

9. The wireless device of claim 8, wherein at least one of the multiple signals is received with multiple repetitions within the same discovery burst and two or more repetitions of the same type of signal is combined by the wireless device.

10. The wireless device of claim 9, wherein the received multiple signals of the same discovery burst comprising one or more of a primary synchronization signal, a secondary synchronization signal, a cell-specific reference signal, and a channel state information reference symbol.

11. The wireless device of claim 8, wherein the one or more processors are further configured to:
report, to a network node, a set of radio resource measurements, the radio resource measurements based at least in part on the multiple signals of the discovery burst and comprising one or more of a reference signal received quality and a reference signal received power.

12. The wireless device of claim 8, wherein the one or more processors are further configured to:
communicate (1004) capability information to a network node, the capability information indicating to the network node whether the wireless device is capable of using the discovery burst for performing at least one radio measurement.

13. The wireless device of claim 8, wherein the received multiple signals comprises of one or more of a cell-specific reference signal and a channel state information reference symbol, and the multiple signals are received in subframes other than subframes 0 and 5.

14. The wireless device of claim 8, wherein the radio measurement is based only on the signals occurring within the discovery burst.

15. A method in a network node, comprising:
creating a discovery burst based on one or more criteria, the discovery burst comprising multiple signals associated with the network node and included within at least one subframe, each of the multiple signals having one or more associated measurement functions, the multiple signals of the discovery burst for performing, by a wireless device, at least one radio measurement based at least in part on a particular one of the signals of the discovery burst, the performed at least one radio measurement corresponding to a measurement function associated with the particular signal of the discovery burst, and wherein the discovery burst comprises N subframes occurring with a periodicity of once every M subframes, where N is greater than or equal to 1 and where M is greater than or equal to 10;
transmitting the discovery burst for use by the wireless device performing the at least one radio measurement;
receiving, from the wireless device, capability information, the capability information indicating to the network node whether the wireless device is capable of using the discovery burst to perform at least one radio measurement; and performing one or more radio operations based at least in part on the received capability information, wherein the one or more radio operations include forwarding the received capability information to a second network node for use after a cell change by the wireless device or determining whether to configure multiple cell-specific reference signals in a radio node.

16. The method of claim 15, wherein the one or more criteria include one or more of:
   a signal quality at one or more wireless devices;
   a speed of one or more wireless devices;
   a location of one or more wireless devices; and
   a recommendation received from one or more wireless devices, the recommendation recommending multiple repetitions or processes of one or more signals for transmission within the discovery burst by the network node.

17. The method of claim 15, wherein at least one of the multiple signals is sent with multiple repetitions within the same discovery burst.

18. The method of claim 17, wherein the received multiple signals of the same discovery burst comprising one or more of a primary synchronization signal, a secondary synchronization signal, a cell-specific reference signal, and a channel state information reference symbol.

19. The method of claim 15, further comprising:
   receiving, from the wireless device, a set of radio resource measurements, the radio resource measurements based at least in part on the multiple signals of the discovery burst and comprising one or more of a reference signal received quality and a reference signal received power.

20. The method of claim 15, wherein the received multiple signals comprises of one or more of a cell-specific reference signal and a channel state information reference symbol, and the one or more signals are transmitted in subframes other than subframes 0 and 5.

* * * * *

UNITED STATES PATENT AND TRADEMARK OFFICE
CERTIFICATE OF CORRECTION

PATENT NO. : 10,091,774 B2
APPLICATION NO. : 14/909340
DATED : October 2, 2018
INVENTOR(S) : Koorapaty et al.

Page 1 of 2

It is certified that error appears in the above-identified patent and that said Letters Patent is hereby corrected as shown below:

In the Drawings

Figure 1:
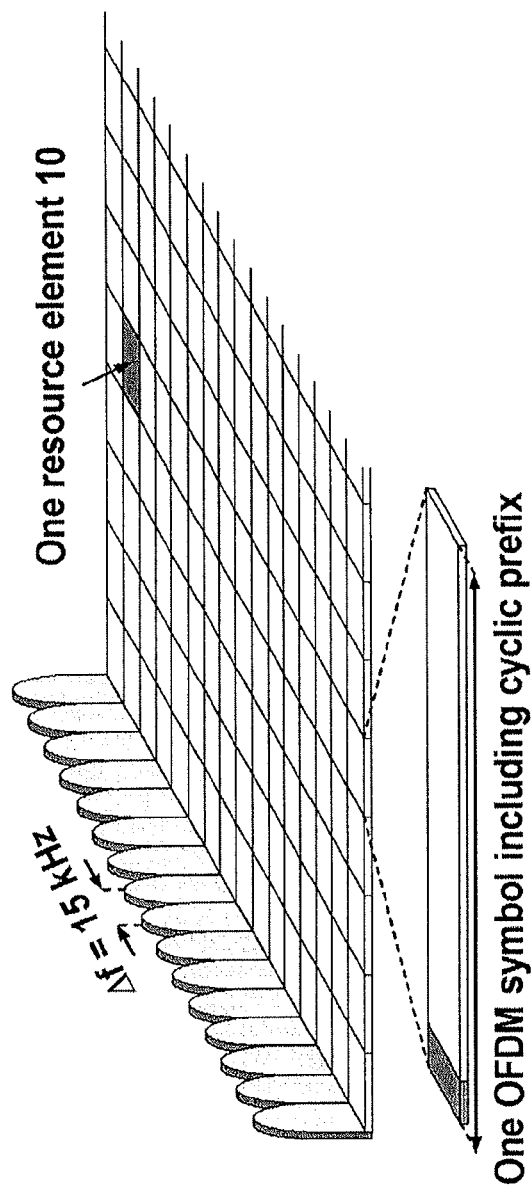
FIG. 1 is a schematic diagram of an LTE downlink physical resource.
Figure 2:
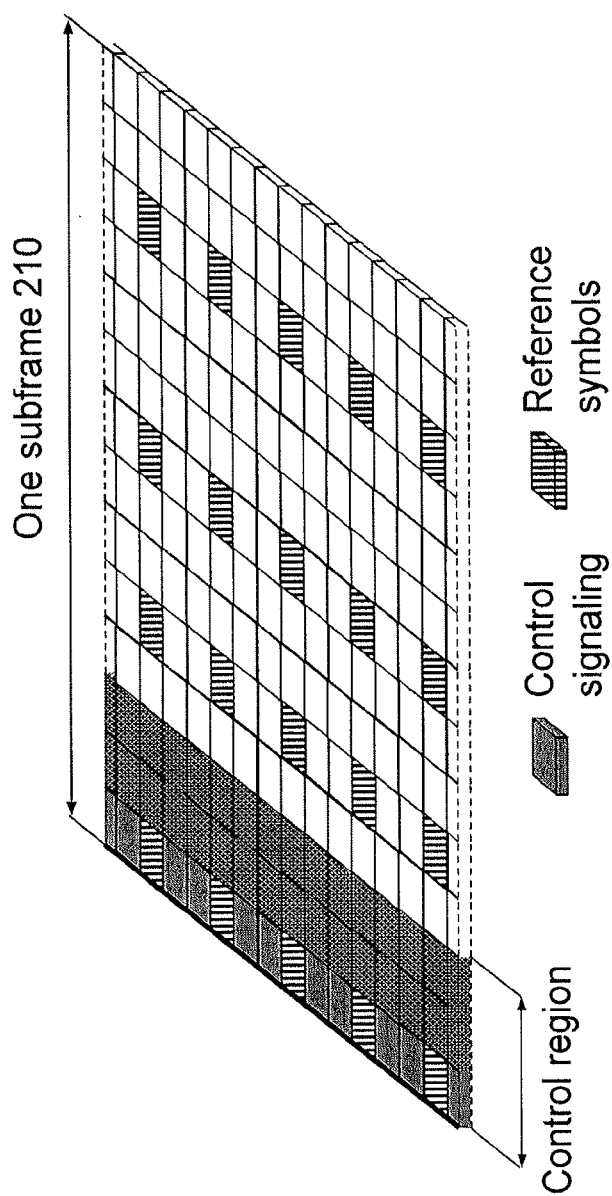
FIG. 2 is a schematic diagram of a downlink subframe.
Figure 3:
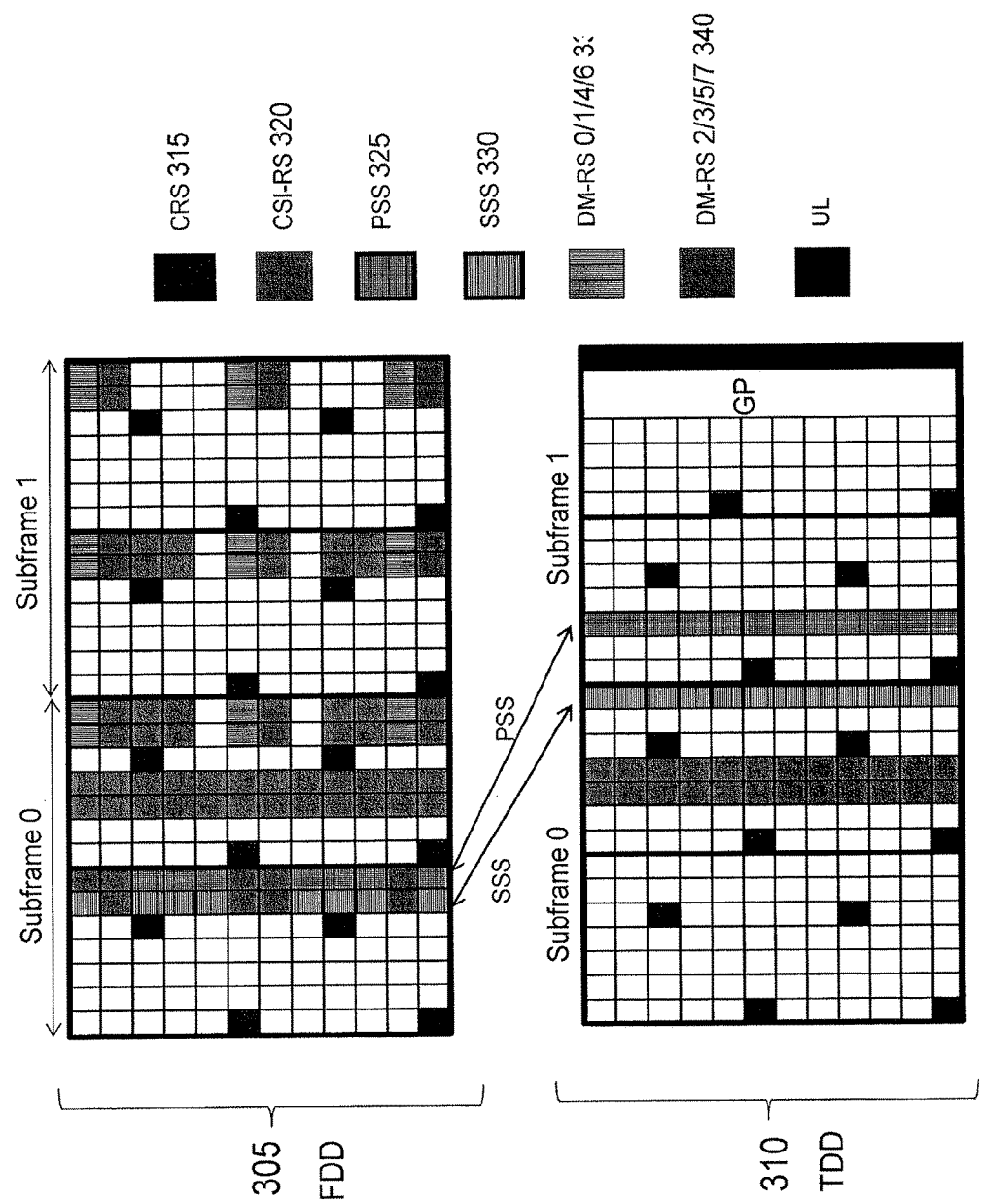
FIG. 3 is a schematic diagram illustrating reference signals in frequency division duplex and time division duplex.

In Fig. 3, Sheet 3 of 14, delete "   " and insert --   --, therefor.

In Fig. 5, Sheet 5 of 14, delete "   " and insert --   --, therefor.

In the Specification

In Column 3, Line 42, delete "burst. the" and insert -- burst. The --, therefor.

In Column 4, Line 49, delete "FIG. 12 a" and insert -- FIG. 12 is a --, therefor.

In Column 14, Line 13, delete "SSSS." and insert -- SSS3. --, therefor.

In Column 18, Line 9, delete "FIG. 12 a" and insert -- FIG. 12 is a --, therefor.

Signed and Sealed this
Twelfth Day of May, 2020

Andrei Iancu
*Director of the United States Patent and Trademark Office*

In Column 18, Line 17, delete "type (MTC)" and insert -- type communication (MTC) --, therefor.

In the Claims

In Column 24, Line 35, in Claim 12, delete "communicate (1004)" and insert -- communicate --, therefor.